INVENTORS
R. E. HELTZEL
A. SHERMAN
A. SHERMAN
R. K. BRUGLER
J. C. BENNETT

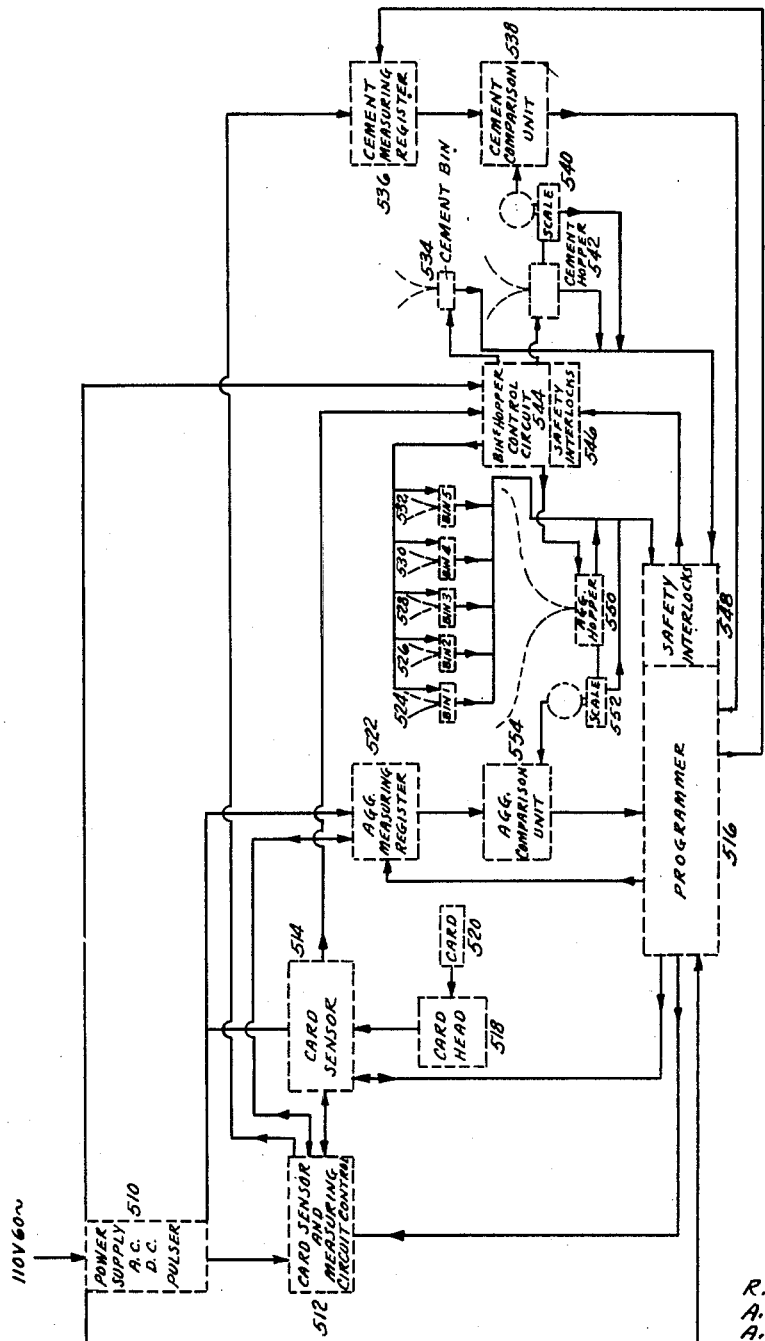

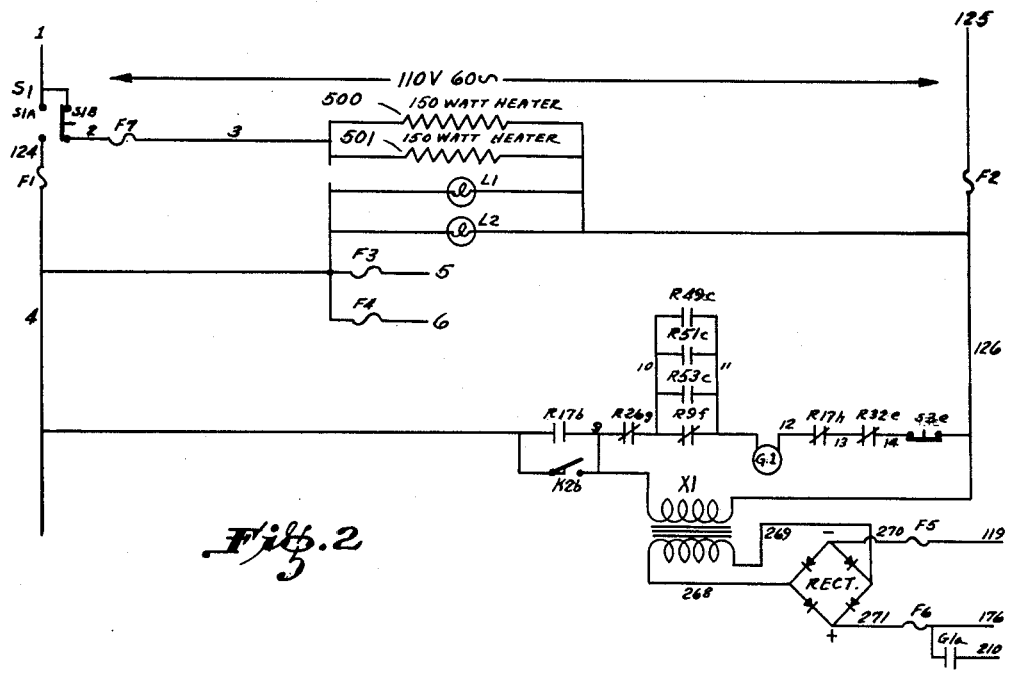

BY Wilkinson, Mawhinney & Theibault
ATTORNEYS

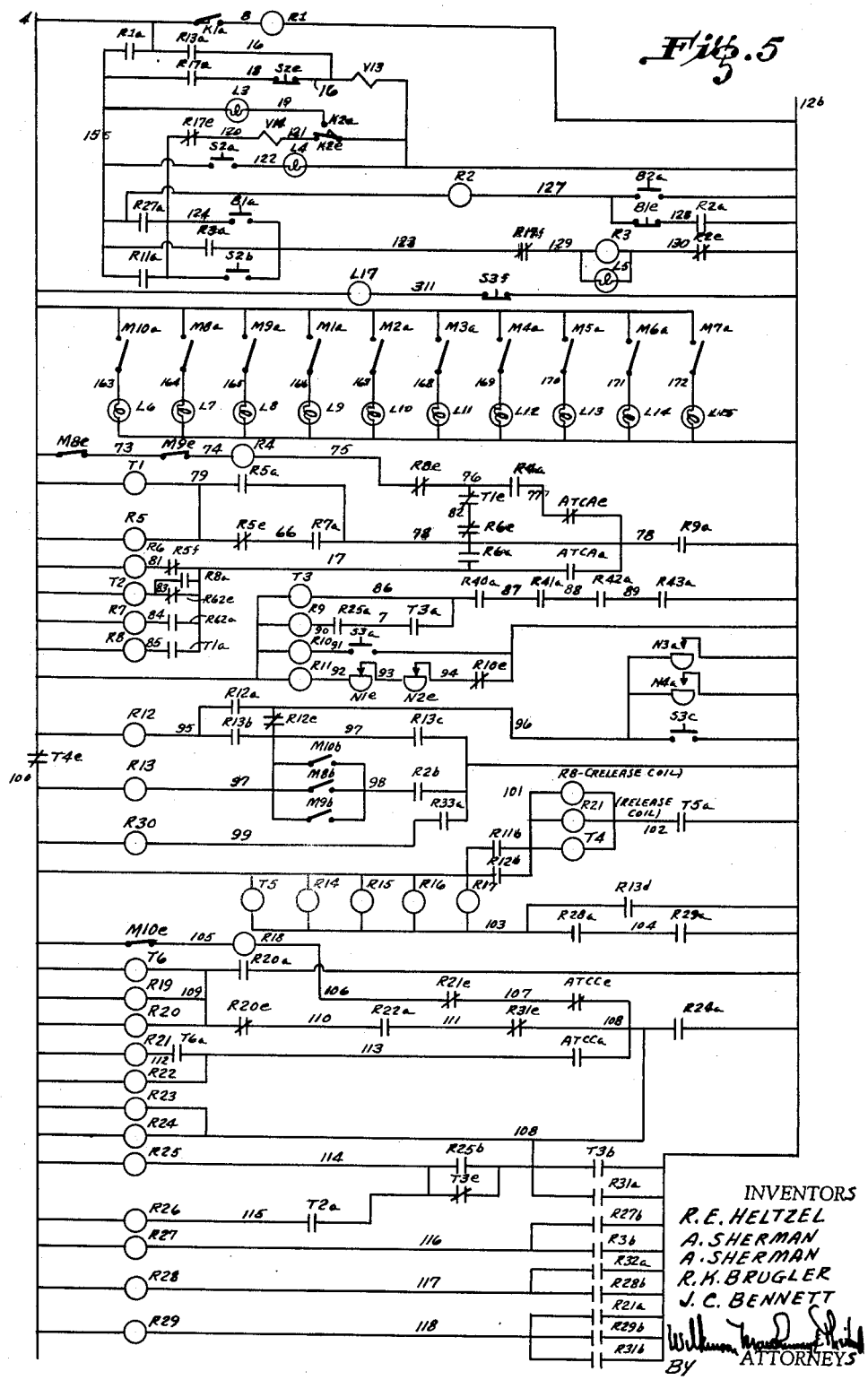

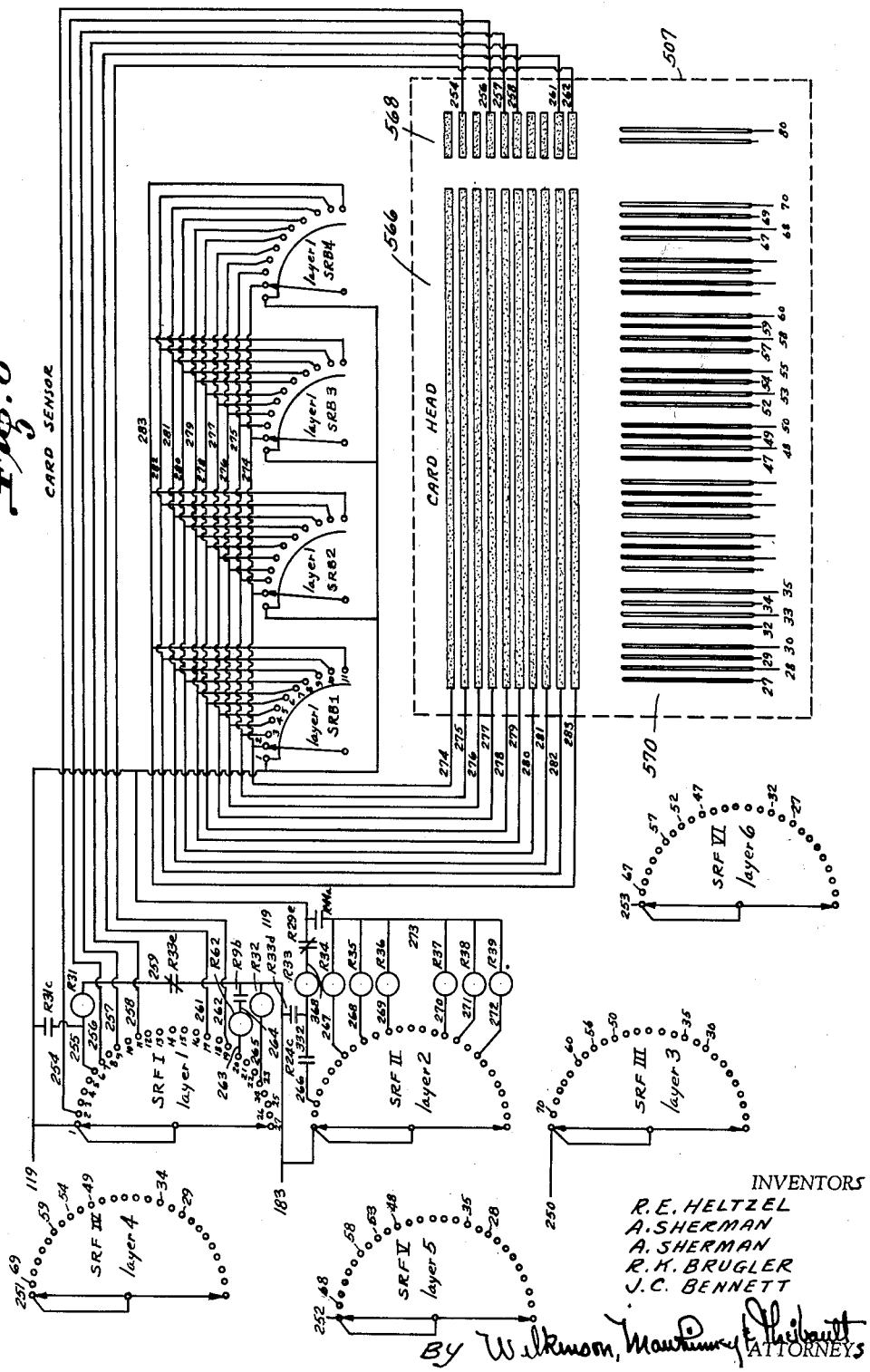

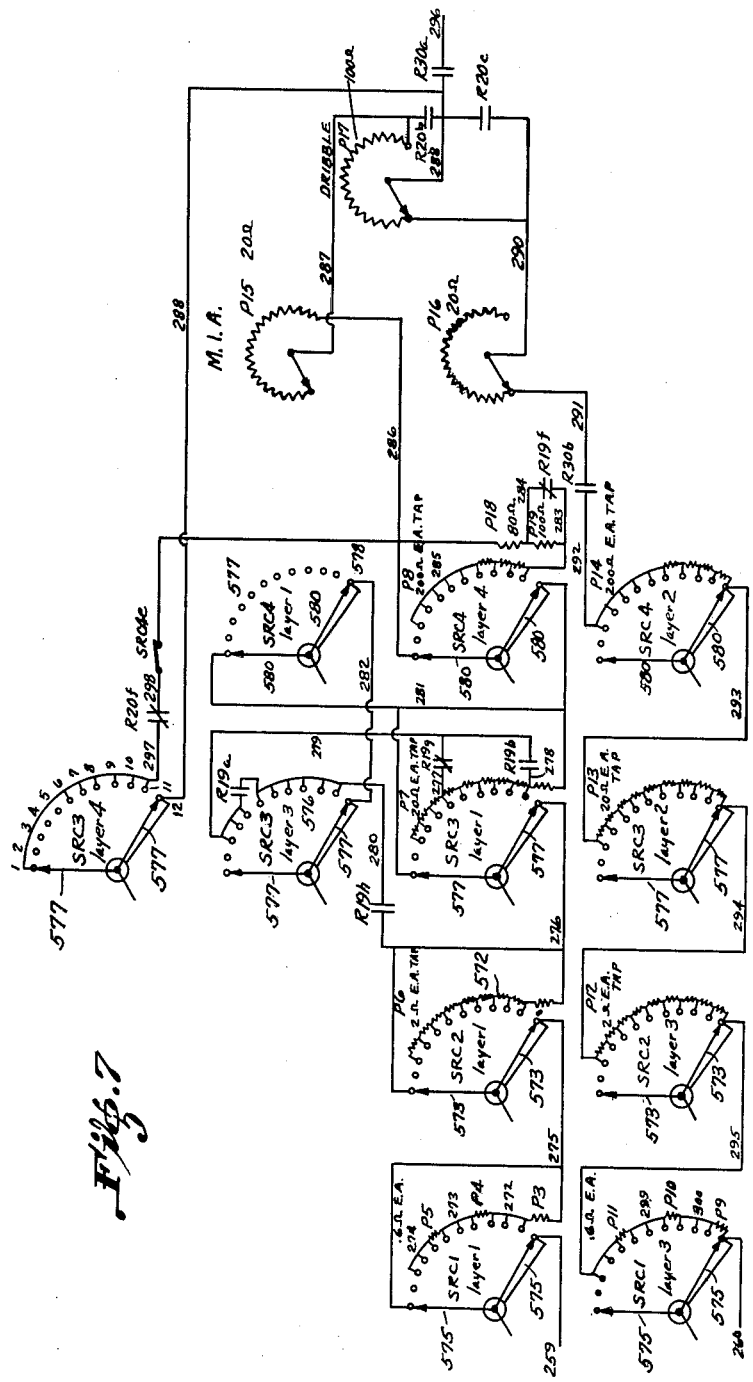

INVENTORS
R.E. HELTZEL
A. SHERMAN
A. SHERMAN
R.K. BRUGLER
J.C. BENNETT

Nov. 10, 1964

R. E. HELTZEL ETAL  3,156,312
APPARATUS FOR AUTOMATICALLY DISCHARGING AND WEIGHING
PRE-SELECTED PLURAL MATERIALS

Filed Feb. 8, 1957                                                            11 Sheets-Sheet 8

INVENTORS
R. E. HELTZEL
A. SHERMAN
A. SHERMAN
R. K. BRUGLER
J. C. BENNETT

BY Wilkinson, Mawhinney & Thiebault
ATTORNEYS

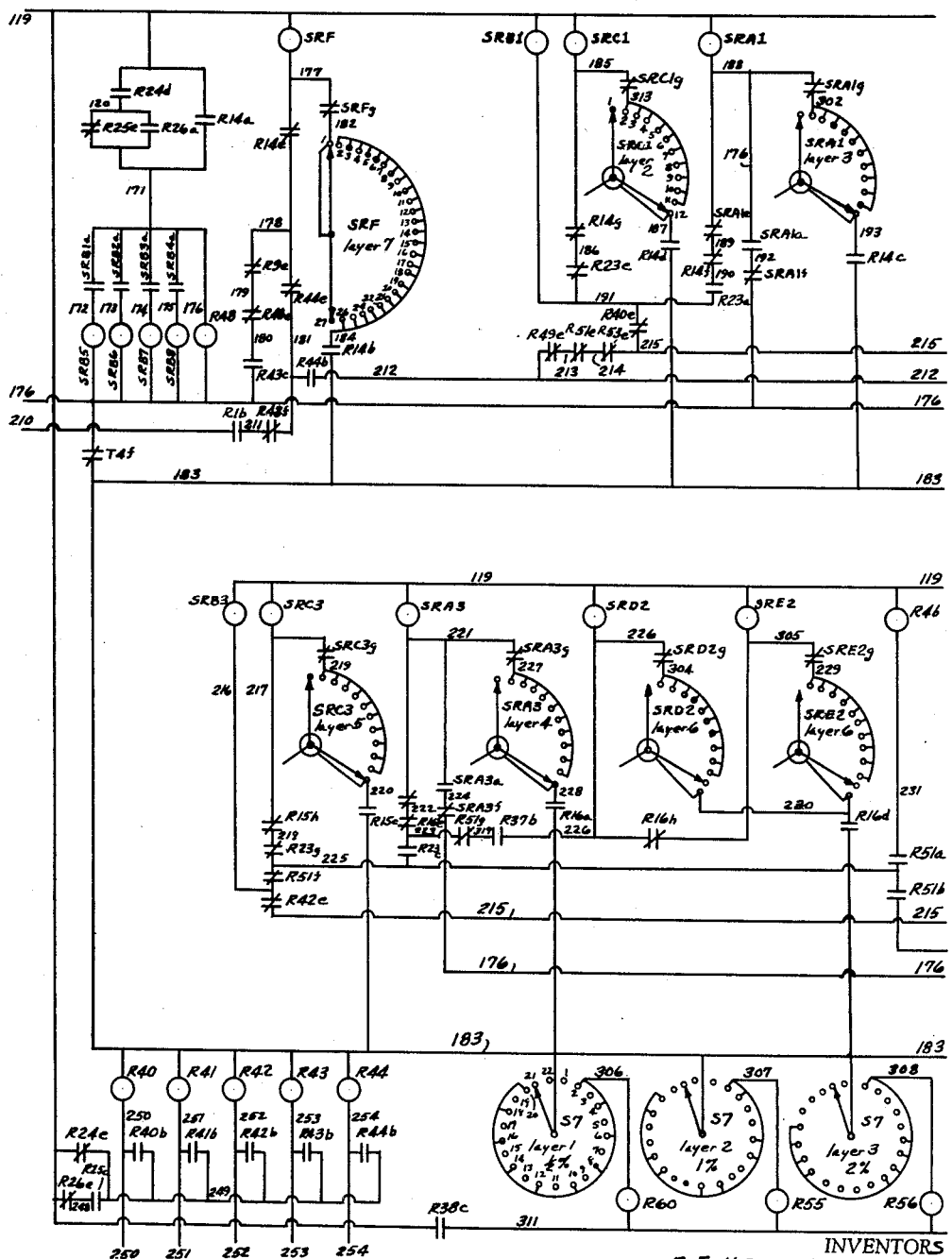

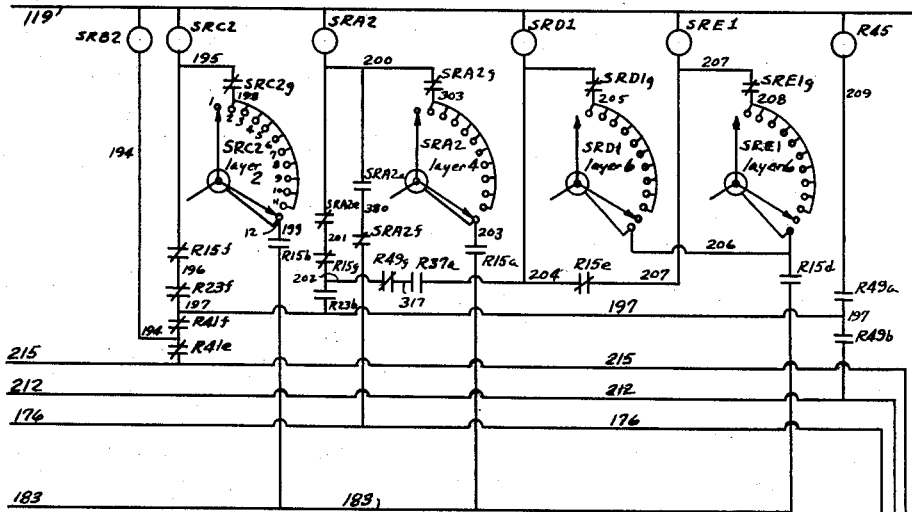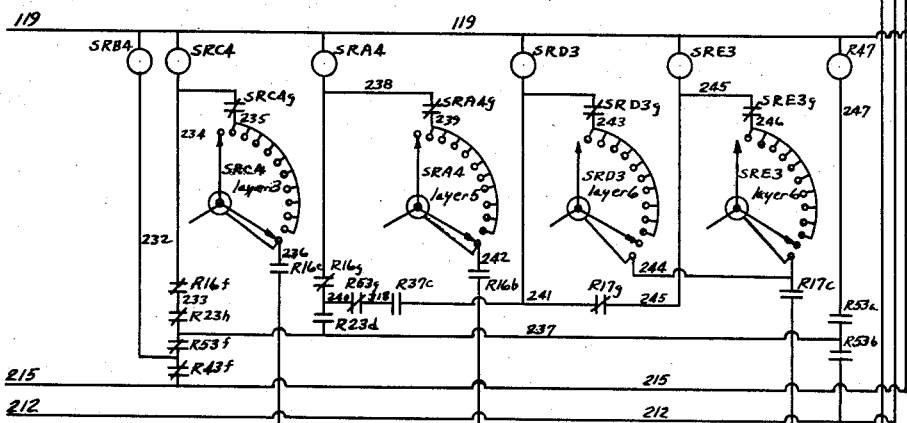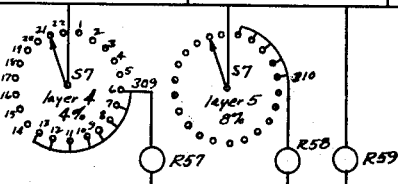
*Fig. 10B*
INVENTORS
R. E. HELTZEL
A. SHERMAN
A. SHERMAN
R. K. BRUGLER
J. C. BENNETT
BY
Wilkinson, Mawhinney & Thiebault
ATTORNEYS Nov. 10, 1964   R. E. HELTZEL ETAL   3,156,312
APPARATUS FOR AUTOMATICALLY DISCHARGING AND WEIGHING
PRE-SELECTED PLURAL MATERIALS
Filed Feb. 8, 1957   11 Sheets-Sheet 11

Fig. 11

INVENTORS
R. E. HELTZEL
A. SHERMAN
A. SHERMAN
R. K. BRUGLER
J. C. BENNETT
BY Wilkinson, MacKinney & Thibault
ATTORNEYS ated Nov. 10, 1964

3,156,312
APPARATUS FOR AUTOMATICALLY DISCHARGING AND WEIGHING PRE-SELECTED PLURAL MATERIALS
Robert E. Heltzel, Arnold Sherman, Alex Sherman, Richard K. Brugler, and John C. Bennett, all of Warren, Ohio, assignors to The Heltzel Steel Form and Iron Co., Warren, Ohio, a corporation of Ohio
Filed Feb. 8, 1957, Ser. No. 638,946
5 Claims. (Cl. 177—70)

This invention relates to apparatus for automatically discharging and weighing pre-selected plural materials and more particularly to such apparatus for accurately accumulating in one mixture desired quanities of pre-selected materials.

It is desired to provide an automatic device for quickly and automatically combing constituents of a bulky mixture such as concrete with an absolute minimum of human operation. It is also desired to maintain high standards of cumulative accuracy for such a mixture so that demanding specifications for a particular mixture may be automatically completed with.

Various automatic mechanisms have been produced which endeavor to achieve the mixture of bulky materials, but some of these devices suffer the disadvantages of inaccuracy, inflexibility, and high construction or maintenance expense. Devices which weigh of measure various constituent materials of a mixture individually on different scales and the like before combining the various constituents of the mixture suffer a cumulative error due to unavoidable differences in the individual scales. It is difficult to obtain the exact ratio of constituents desired or the exact total weight of mixture desired with such a system. Furthermore, apparatus including a plurality of weighing devices is inordinately expensive.

Apparatus using but a single cumulative scale quite often suffers from inaccuracy due to the burdening of the weighing mechanism with a plurality of weight detecting contacts or indices and from inaccuracy due to the necessary spacing between these indices so that they may be accommodated. The latter system also has the disadvantage of inflexibility due to the necessity for moving these indices between batches if successive batches have different constituent requirements.

It is accordingly an object of this invention to provide an improved cumulative discharging and weighing apparatus having a single weighing device with a single weighing device sensing element dispensing with the need for multiple electrical contacts operable by the weighing device.

It is another object of this invention to provide an improved cumulative discharging and weighing apparatus which takes directions for each batch directly and immediately from recorded media such is perforated business machine cards or the like, thus providing utmost flexibility for changing batch requirements.

It is another object of this invention to provide an improved cumulative discharging and weighing apparatus into which information can be set to prevent inaccuracies in weighing due to moisture variations in the materials to be weighed.

In accordance with an embodiment of the invention, a perforated business machine card is read periodically to determine the next of a plurality of materials to be discharged into a common weighing container associated with a common weight indicating device or scale. The information as to the type of material desired initiates opening of a bin gate to discharge said material into the container. The card also contains information as to the exact quantity or weight of said material desired. The weight information detected on the machine card is transferred into an accumulating electrical register which contains, then, the numerical or electrical counterpart of the scale reading at the end of which addition of a material. An electrical transducer is continuously operated by the scale to produce an electrical quantity representative of the total material weighed at any given instant. An electrical circuit compares the quantities from the register and from the transducer to determine when they are equal. When equality is obtained the circuit shuts off the bin gate and initiates the interrogation of the machine card to determine what gate should next be opened. The operation is automatically repeated with the register total and weight total accumulating until the necessary information on the card has been fed into the machine to complete a batch and the batch is complete in the scale container.

Although the one embodiment illustrated incorporates a scale for weighing concrete mixture, it is understood that other materials to be batched for industrial use might be measured without departing from the invention, e.g. volume or quantity.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a block diagram representing the apparatus.

FIGURE 2 is a schematic diagram of an A.C., D.C., and Pulse Power Supply associated with the apparatus.

FIGURE 3B is a schematic diagram of the aggregate comparison unit.

FIGURE 5 is a schematic diagram of the programmer.

FIGURE 6 is a schematic diagram of the card sensor and card head.

FIGURE 7 is a schematic diagram of the cement measuring register.

FIGURE 9 is a schematic diagram of another part of the aggregate measuring register.

FIGURE 10A is a schematic diagram of a part of the card sensor and measuring circuit control.

FIGURE 10B is a schematic diagram of another part of the card sensor and measuring circuit control.

FIGURE 11 is a schematic diagram of a perforated business card employed with the apparatus of the present invention.

Figure 4:
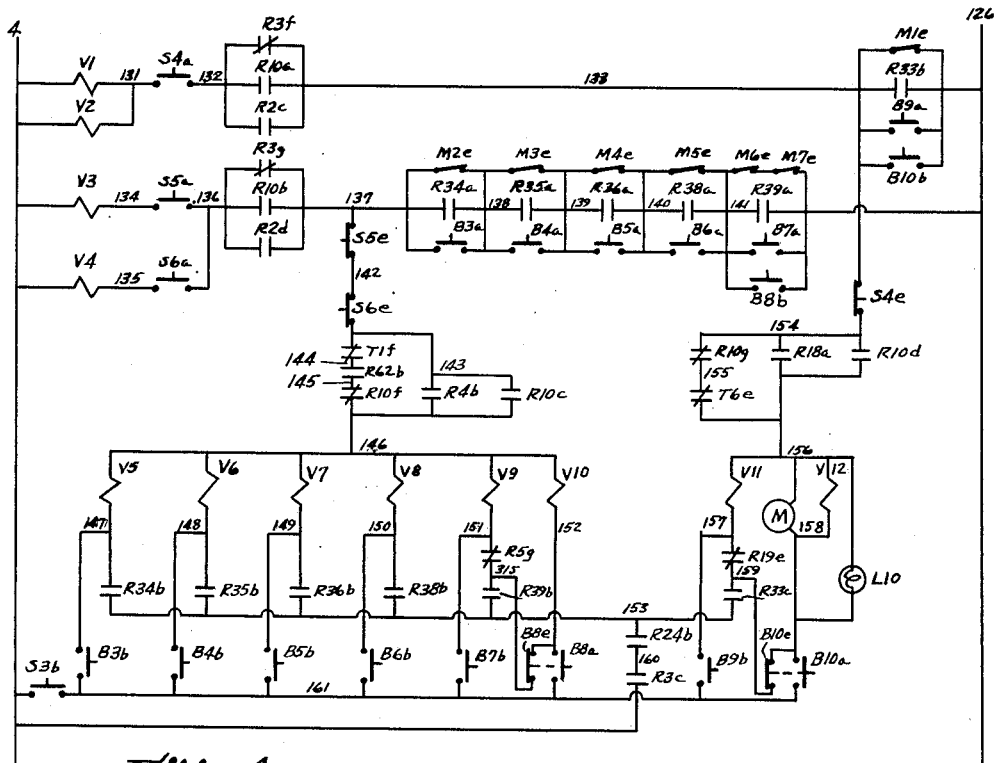
FIGURE 4 is a schematic diagram of the bin and hopper control circuit.

By first outlining the function of each section of the block diagram, FIGURE 1, as well as the interaction of the various sections it is possible to gain a better understanding of the overall apparatus.

Alternating current enters the unit and is used to energize the programmer and safety interlock 516 and 548, the bin and hopper control circuit 544 as well as provide direct current through rectification. This direct current is used to energize the card sensor and measuring circuit control 512, the aggregate measuring register 522 as well as provide pulse current to energize the card sensor and measuring circuit control 512. The perforated business card or information media 520 is inserted in a card head 518 provided with electrical connections to a card sensor 514, bin and hopper control circuit 544 receives instructions from card sensor 514 to begin delivery of one of a number of materials to be contained in bins 524, 526, 528, 530, and 532 and 534. The card sensor 514 also delivers information as to the quantity of certain materials to be weighed to the aggregate measuring register 552 and the cement measuring register 536 via the card sensor and measuring circuit control 512. The card sensor 514 is under the control of the card sensor and measuring circuit control 512 which causes the card sensor to search the card for information as to the type and quantity of material to be weighed. When figures as to the type and quantity of material to be next weighed are discovered and relayed to registers 522 and 536 the card sensor and measuring circuit control 512 causes the card sensor 514 to discontinue the hunting operation. Material is delivered to an aggregate hopper 540 associated with aggregate scale and material is also delivered to cement hopper 542 associated with cement scale 540. Electrical transducers (not shown) are associated with scales 540 and 552. These transducers, to be described later, provide electrical signals representative of the weights contained in hoppers 550, and 542 to cause the units 554 and 538 to be actuated. These comparison units detect when the voltage provided by the respective transducer equals the relay quantity to be set up in the register. The registers 522 and 536 contain a number of electrical resistors which are set to represent the weight of material to be desired; when this weight is reached the respective comparison units represented at 554 and 538 signal to programmer 516 to suspend delivery of the given material. The programmer 516 closes the gates of whatever bins happen to be delivering the material and initiates another cycle of operation by signalling the card sensor 514 and the card sensor and measuring circuit control 514 to cause the card sensor to sweep the card for the next material to be delivered. Safety interlocks 546 and 548 prevent improper use of the apparatus.

The operation is controlled by a card 520 which has been punched for the delivery of specified weights of specific materials. The card head 518 is so arranged that an electrical contact is closed through each punching in the card. Because of the location of each hole in the card its column and row determine a specific parameter of operation. The card head 518 is so arranged that by sweeping over the connection of the card head 518 the column and row of each punching can be ascertained. The card sensor 514 consists of relays which sweep over the connections of the card head 518. These relays are stopped when they locate a punching. The card sensor and measuring circuit control 512 consists partly of the coils and contacts which cause a relay of the card sensor 514 to sweep until a punching is found and then stop. The above control also consists of the coils and contacts which set up the aggregate measuring register 522 and cement measuring register 536. This also signals the bin and hopper control circuit 544 which bin is to be opened to deliver material.

Each of the above mentioned measuring registers consists partly of resistors so attached to relays that the ratio of sought resistance to the total circuit resistance is proportional to the desired number of pounds.

It is noted that the system of the block diagram provides a separate register and weighing means for cement and aggregate. It is thus a double system according to the invention. It is understood that separation is for convenience and that cement bins might have been as easily associated with the aggregate hopper.

The scale attached to each weigh hopper 542, 550 contains an electrical transducer to be described later which is connected to the scales 540, 552 and a differential transformer which induces across one of the secondary windings thereof a voltage proportional to the scale reading. This voltage as well as the voltage from the corresponding register is fed to a comparison unit which is a null balance detector. When the above voltages are equal the desired weight of material has been reached. The comparison unit signals this fact to the programmer 516 which causes the bin and hopper control circuit 544 to close and the bin gates stop the flow of material. The safety interlocks 546 and 548 provide for not allowing other bins and hoppers to open when so doing would ruin a batch or cause a waste of material. The programmer 516 provides the necessary relaying and timing information to insure that each material to be delivered or skipped in any batch as well as providing for interdependent operation in various sections is completed in their proper sequence and without interference. As each operation is completed the programmer allows the next operation to begin.

Operation will now be described in conjunction with the block diagram, FIGURE 1, on a sample run of selected material. Connecting the apparatus to 110 volts 60 cycle power, turning the unit on and selecting "automatic operation" prepares the unit. When the card 520 is now correctly placed into the card head 518, contacts drop down to complete a circuit through the card. After these circuits are closed a relay of the card sensor 514 senses the connections to one column of the card to find the first material desired. Each material has its own column. In this column a punched opening indicates that the material is needed in this batch, finding out, for instance, cement is desired this card sensor relay is stopped by the card sensing and measuring circuit control 512 in a position which allows other columns of the card to be further searched for the desired weight of cement. The card sensing and measuring circuit control 512 signals the programmer 516 and the bin and hopper control circuit 544 that cement is desired. The programmer 516 then signals the card sensor and measuring circuit control 512 to close relays to search for the punched weight of cement and other relays in the cement measuring register to set up resistances for this weight. When the punched weight has been determined the card sensor 514 and cement measuring register 536 relays are stopped by the card sensor and measuring circuit control 512 and the programmer 516 is signaled.

The programmer 516 causes the various sections of the unit to prepare for selecting the first aggregate desired and then it signals the card sensor and measuring circuit control 512 to cause the card sensor 514 to determine the first aggregate desired by searching the material column, finding that, for instance aggregate one is desired this card sensor and measuring circuit control 512 stops the card sensor 514 in a position which allows other columns to be further searched for the desired weight of aggregate one. The card sensing and measuring circuit control 512 signals the programmer 516 and bin and hopper control circuits 544 that aggregate one is desired. The programmer 516 then signals the card sensing and measuring circuit control 512 to close relays to search for the punched weight of aggregate one and other relays in the aggregate measuring register 522 to set up resistance for this weight. When the punched weight has been determined the card sensing and aggregate measuring circuit, relays are stopped by the card sensing and measuring circuit control 512 and the programmer 516 is signaled. After the above operations are completed if the programmer 516, as well as the safety interlocks 548 are in the proper position, the bin and hopper control circuit 544 is ready to allow opening of the cement and aggregate one bins when the start button is pressed.

Pressing the start button delivers cement into the cement hopper 542 and aggregate one into the aggregate hopper 550. The material in air controls and dribble feed controls (to be described later) in the cement measuring register 536 causes the voltage from the cement measuring register to equal the voltage of the differential transformer associated with scales 540 before the weight punched in the card is reached. The cement comparison unit 538 is energized for as long as the voltage from the differential transformer is less than the voltage from the register circuit. When the two voltages are equal or when the reverse of the above is true the comparison unit de-energizes. The first de-energizing of the cement comparison unit 538 signals the programmer 516 to cause the bin and hopper control circuit 544 to shut off the fast flow of cement and change the cement measuring register to again energize the cement comparison unit 538 the "dribble feed" of cement continues at a slower rate until the desired weight minus the material in air setting is reached. At this point the cement comparison unit 538 signals the programmer 516 which causes the bin and hopper control circuit 544 to stop the delivery of cement by shutting the cement bin. The cement in the air between the bin and hopper falls into the hopper causing the weight of cement delivered to equal the weight of the cement punched in the card.

When aggregate one reaches the punched weight minus a material in air setting the aggregate comparison unit 544 signals the programmer 516 which causes the bin and hopper control circuit 544 to stop delivery of aggregate one by shutting the aggregate one bin gate. The material in air between the bin and the hopper falls into the hopper causing the weight of aggregate one delivered to equal the weight of aggregate one punched into the card.

The programmer 516 causes the various sections of the unit to prepare for selecting the next material and then signals the card sensor and measuring circuit control 512 to cause the card sensor 514 to determine the next aggregate desired by searching the materials column on the card finding that, for instance, aggregate two is desired this relay is stopped by the card sensing and measuring circuit control 512 in a position which allows other columns to be further searched for a desired weight of aggregate two. The card sensing and measuring circuit control 512 signals the programmer 516 and bin and hopper control circuit 544 that aggregate two is desired. The programmer 516 then signals the card sensor and measuring circuit control 512 to cause relays to search for the punched weight of aggregate two and other relays in the aggregate measuring register 522 to set up resistance for this weight. When the punched weight has been determined the card sensor and aggregate measuring register relays are stopped by the card sensor and measuring circuit control 512 and the programmer 516 is signaled.

While the card 520 is punched for the number of pounds of each material desired the resistors in the aggregate measuring register 522 set a ratio proportional to the weight of previous aggregates desired plus the desired weight of this aggregate which will be equal to the scale reading when this aggregate reaches its desired weight. When the programmer 516 has been signalled that the material and its weight have been selected, the bin and hopper control circuit 544 is signalled. If all safety interlocks are in their proper position the unit is ready to begin the delivery of aggregate two from the aggregate two bin into the aggregate hopper 550.

When aggregate two reaches the punched weight minus the material in air setting the aggregate comparison unit 544 signals the programmer 516 which causes the bin and hopper control circuit 540 to stop the delivery of aggregate two by shutting the aggregate two bin gate. The material in air between the bin and hopper falls into the hopper causing the weight of aggregate two to equal the weight of aggregate two punched into the card. The scale now reads the total weight of aggregate one plus aggregate two.

The programmer 516 causes the various sections of the unit to prepare for selecting the next material and then it signals the card sensor and measuring circuit control 512 to cause the card sensor 514 to determine the next aggregate desired by searching the material column.

When the programmer 516 has been signalled that the material and its weight have been selected the bin and hopper control circuit 544 is signalled. If all safety interlocks are in their proper position to begin the delivery, then delivery begins of aggregate three to the aggregate hopper 550. When aggregate three reaches the punched weight minus the material in air setting the aggregate comparison unit 544 signals the programmer 516 which causes the bin and hopper control circuit 540 to stop the delivery of the aggregate three by shutting the aggregate three bin gate. Material in the air between the bin and hopper falls into the hopper causing the weight of aggregate delivered to equal the weight of aggregate three punched into the card. The programmer 516 now causes the various sections of the unit to prepare for selecting the next material. It then signals the card sensor and measuring circuit control 512 to cause the card sensor 514 to determine the next aggregate desired by searching the material column finding for instance that sand is desired this card sensor relay is stopped by the card sensor and measuring circuit control 512 in a position which allows other columns to be further searched for the desired weight of sand. The card sensor and measuring circuit control signals the programmer 516 and the bin and hopper control circuits 544 that sand is desired. The programmer 516 then signals the card sensor and measuring circuit control to cause relays to search for the punched weight of sand and other relays in the aggregate measuring register 522 to set up resistance for this weight. Depending upon the percent moisture of the sand other relays in the card sensor and measuring circuit control 512 cause relays in the aggregate measuring register 522 to take up such a position as to weigh a quantity of sand equal to the punched weight of the sand plus sufficient additional weight of sand to make up the weight of water contained in the moist sand. The total weight of sand delivered is the weight of dry sand (equal to the weight of sand punched into the card) plus some weight of water. When the punched weight has been determined the card sensor and aggregate measuring circuit relays are stopped by the card sensor and measuring circuit control 512 and the programmer 516 is signalled. When the programmer 516 has been signalled that the material and its weight have been selected the bin and hopper control circuit 544 is signalled if all interlocks are in proper position, the delivery of sand will begin to the aggregate hopper 550. When the sand reaches the punched weight plus the correction value for the percent of moisture and minus the material in air setting the aggregate comparison unit 554 signals the programmer 516 which causes the bin and hopper control circuit 544 to stop the delivery of sand by shutting the sand bin gate. The material in the air between the bin and the hopper falls into the hopper causing the dry weight of sand to equal the weight of sand punched into the card. The weight of water delivered with the sand equals the total weight of the previously desired materials subtracted from the scale reading at this time. The programmer 516 causes the various sections of the unit to prepare for selecting the next material and then it signals the card sensor measuring circuit control 512 to cause the card sensor 514 to determine the next aggregate desired by searching the material column finding that, for instance, water is desired this card sensor relay is stopped by the card sensor and measuring circuit control 512 in a position which allows other columns to be further searched for the desired weight of water. The card sensor 514 signals the programmer 516 and bin and hopper control circuit 544 that water is desired. The programmer 516 then signals the card sensor and measuring circuit control 512 to cause relays to search for the punched weight of water and other relays in the aggregate measuring register 522 to set up resistances for this weight. When the punched weight is determined the card sensor 514 and aggregate measuring register 522 relays are stopped by the card measuring circuit control 512 and the programmer 516 is signalled.

While the card is punched with the number of pounds of water desired the resistors in the aggregate measuring register 522 set up a ratio proportional to the weight of the previous aggregates desired plus the desired weight of water. This setting is of course equal to the scale reading when water reaches the weight of water punched into the card. The amount of water delivered at this time equals the weight of the water punched into the card minus the water previously delivered as moisture in the sand.

"Material in air" controls and "dribble feed" controls in the water measuring circuit cause the voltage in the aggregate measuring register 522 to equal the voltage from the differential transformer associated with the scale before the desired weight is reached. The aggregate comparison unit 544 will then be energized and signal the programmer 516 to cause the bin and hopper control circuit 544 to shut off the fast flow of water and change the aggregate measuring circuit register 522 to again energize the aggregate comparison circuit 554. Dribble feed of water continues until a weight equal to the desired weight minus the material in air setting is reached. At this point the aggregate comparison unit 544 signals the programmer 516 which causes the bin and hopper control circuit 544 to stop the delivery of water by shutting off the water. The water in the air between the bin and the hopper falls into the hopper causing the weight of the water delivered plus that delivered as part of the sand as moisture to equal the weight of water punched into the card.

The batch is now complete and if all safety interlocks are in their proper position the batch is ready to be discharged from the hoppers. Actuating the hopper discharge switches will now discharge the cement and aggregate from their respective hoppers 542 and 550 and signal the programmer 516 to prepare all circuits of the unit for starting another batch. The card 520 for this particular batch is rejected from the card head 518. The hopper gates are now closed and the apparatus is ready to begin another punched card controlled batch.

The various figures enumerated above will be described in detail and then the overall circuit operation will be described with reference to these figures.

It should be noted in the following description that relay operating coils are designated by the letter R followed by a number identifying the particular coil. A coil designation followed by a letter, for example R45a, indicates a set of relay contacts operated by the corresponding operating coil. The contacts may be normally open or normally closed.

A.C., D.C. Pulse Power Supply

Referring to FIGURE 2, a source of 110 volt 60 cycle power is connected between lines 1 and 125. Switch S1, the circuit power switch, has normally closed contacts, S1e and normally open contacts S1a. The normally closed contacts are connected between the aforementioned line and fuse F7. Line 3 connects fuse F7 to two 150 watt heaters, 500 and 501 in parallel. The remaining end of these heaters is connected to a parallel circuit comprising lamps L1 and L2 and to line 125 which receives power through fuse F2 from line 125. The normally open contacts S1a provide power through fuse F1 to line 4 which is connected to the remaining end of lamps L1 and L2 as well as fuses F3 and F4 which are connected to lines 5 and 6 further represented on FIGURE 3. Line 4 is also connected to normally open contacts on relay R17b and thence to normally closed contacts R26g of relays R17 and R26 respectively. Microswitch contacts K2b of microswitch K2 are connected in parallel with relay contacts R17b. The juncture of relay contacts R17 and R26g is connected to the primary winding of transformer X1. The remaining end of primary X1 is connected to line 126. The secondary of transformer X1 supplies the voltage proper for the stepping relays of the apparatus through bridge rectifier. The output of the bridge rectifier is coupled through fuses F5 and F6 to lines 119 and 176 respectively. Line 176 is connected through normally open relay contacts G1a to line 210. A parallel circuit composed of normally open contacts R49c of relay R49, normally open contacts R51c of relay R51, and normally open contacts R53c of relay R53, and normally closed contacts R9f of relay R9 are interposed between relay contacts R26g and motor G1. Motor G1 operates the aforementioned contacts G1a to provide pulsed power to line 210. The remaining end of motor G1 is coupled through the series connection composed of normally closed contacts R17h of relay R17 and normally closed contacts R32e of relay R32, and normally closed contacts of switch S3 designated as S3e to line 126.

Aggregate and Cement Comparison Units

Figure 3A:
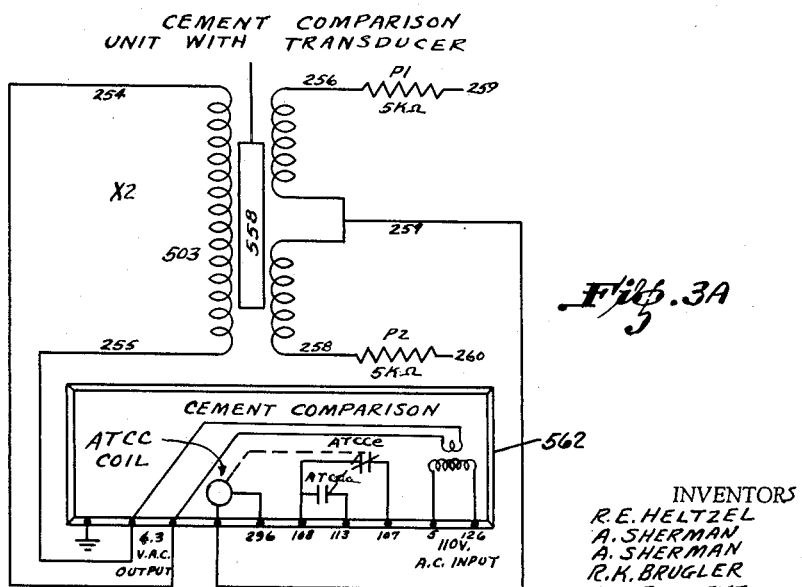
FIGURE 3A is a schematic diagram of the cement comparison unit.

Referring now to FIGURES 3A and 3B, there is shown the cement and aggregate comparison units respectively with the associated transducers. The cement transducer is composed of differential transformer X2 with movable coil 558 mechanically connected to cement scale being indicated at 540 in FIGURE 1. Aggregate transducer is composed of differential transformer X3 with movable coil 560 physically connected to the aggregate scale indicated at 552 in FIGURE 1. The primary of transformer X2 is supplied with 6.3 volts alternating current from the comparison unit via lines 254 and 255; likewise, the primary of transformer X3 is supplied with 6.3 volts alternating current from its associated comparison unit via lines 261 and 262. The comparison units comprise relays having contacts ATCCa and ATCCe in the case of the cement comparison unit and ATCAa and ATCAe in the case of the aggregate comparison unit, the cement comparison unit has an actuating coil connected between terminal 296 and lead 257 while the aggregate comparison unit has an actuating coil connected between line 264 and terminal 301. These actuating coils open and close the respective comparison unit contacts at the time that the scale weight equals the amount of weight set in the respective registers. The X2 differential transformer has a split secondary winding connected to the aforementioned lead 257 with the outside leads of the transformer secondary being connected to the resistors P1 and P2 to lines 259 and 260 respectively. In the case of the aggregate differential transformer X3, the center tap of the transformer secondary is connected to the aforementioned line 264 with the outside leads of the secondary being connected to resistors P66 and P67 to leads 266 and 267. The outside secondary leads in each case are connected to the respective measuring registers, which are discussed later. The sum of the voltages across the split secondaries of transformers X2 and X3 is constant within operating limits.

Bin and Hopper Control Circuit

Referring now to FIGURE 4, there are provided the operating coils V1 and V2 connected to line 4 and in parallel to switch S4a which is in turn coupled to the parallel combination of contacts R3f, R10a and R2c. The remaining side of the parallel combination is connected to another parallel combination of contacts M1e and R33b plus switch B9a and thence to line 126. Also connected between lines 4 and 126 are manual operating coils V3 and V4 connected respectively to switches S5a and S6a these switches being connected together at their far end into the parallel combination of contacts R3g, R10b and R2d. This combination is coupled to lead 137 through the following series connected parallel combinations. Contacts M2e, R34a and switch B3a and thence to contacts M3e, R35a and switch B4a and thence to contacts M4e, R36a and switch B5a and thence to contacts M5e, R38a and switch B6a and thence to contacts M6e and M7e in series, this combination in parallel contacts R39a and switch B7a and thence to line 126. Line 137 is connected through switches S5e and S6e to the parallel combination of contacts R10c, R4b. In parallel with this parallel combination are contacts T1f, R62b and R10f. The far end of the parallel combination is connected to lead 146 which joins one end of the leads of operating coils V5, V6, V7, V8, V9 and V10. The far end of operating coil V5 is connected to switch B3b and contacts R34b. The far end of coil V6 is connected through switch B4b and contacts R35b. The far end of coil V7 is connected to switch B5b and contacts R36b. The far end of coil V8 is connected to switch B6b and contacts R38b. The far end of coil V9 is connected to switch B7b and the series connection of contacts R5g and R39b, the juncture of the latter two contacts is connected to normally closed contacts B8e and thence to the normally open contacts on B8a switch and are connected to line 161. Line 161 is coupled through switch S3b to line 4. The far end of operating coils V5, V6, V7, V8, V9 are connected respectively through contacts R34b, R35b, R36b and R38b to line 153. Line 153 is coupled to line 4 through contacts R24b, and R3c. Line 153 is also connected to coil V11 through contacts R33c and R19e. The juncture of contacts R19e and R33c is connected through normally closed switch contact B10e to normally open contact on the switch and thence to line 161. The juncture of the normally closed and normally open contacts of switch B are connected to motor M, coil V12 and lamp L10 and thence to each of the following in line 156. Line 156 is also connected to the far end of the coil V11. The total combination of contacts R10g and T6e in series, contact R18a, and contact R10d as interposed between line 156 and switch S4e and the far end of switch S4e are connected to line 133. The juncture of coil V11 and contact R19e is connected to switch B9b and to line 161.

*The Programmer*

Referring now to FIGURE 5, a microswitch K1a is interposed between line 4 and operating coil R1 of relay R1. Line 4 is also connected through contact R13a to line 16 and thence to coil V13. At its far end coil V13 is connected to line 126. Line 4 is connected through contact R1a to line 15. Line 15 is connected through contact R17a and switch S2e to line 16. Line 15 is also connected to lamp L3 through microswitch contacts K2a to line 126. Line 15 is also connected through switch S2a and lamp L4 through line 126. Referring to FIGURE 5, line 15 is connected to relay operating coil R2 to line 127 and thence to switch B2a to line 126. Line 127 also connects to switch B1e and thence through contacts R2a to line 126. Line 15 also is connected to contacts 527a and thence to line 124. Line 124 is connected to contacts R17e and coil V14 through microswitch contact K2e to line 126. Line 124 is also connected to switch B1a to line 123. Line 15 is also connected through contacts R3a to line 123. Also line 15 is connected to contacts R11a and through switch S2b to line 123. Line 123 is connected through contacts R17f to line 129 and thence through lamp L5 in parallel with relay operating coil R3 to line 130 and thence to relay contacts R2e to line 126. Line 4 is connected through lamp L17, line 311, switch S3f to line 126. Line 4 is also connected through the following parallel combination of series circuits to line 126. The series circuits include contacts M10a and lamp L6, contact M8a and lamp L7, contacts M9a and lamp L8, contacts M1a and lamp L9, contacts M2a and lamp L10, contacts M3a and lamp L11, contacts M4a and lamp L12, contacts M5a and lamp L13, contacts M6a and lamp L14, contacts M7a and lamp L15. Line 4 is also connected to contacts M8e and contacts M9e to relay coil R4 and thence to contacts R8e, through lead 76 and connected to contacts R4a and thence to contacts ATCAe also shown in FIGURE 3. The opposite end of contact ATCAe is connected to line 78. Line 78 is connected to contacts R9a to line 126. Line 4 is also connected to operating coils T1 and R5 in parallel to line 79. Line 79 is connected to the parallel combination of contacts R5a and the series combination of R5e and R7a to line 78. Line 78 is also connected to contacts R6e and contacts T1e in series to line 76. Line 78 is connected to contacts R6a to line 17. Line 4 is connected to operating coil R6 and relay contacts R5f to line 17. Line 17 is connected to contacts R6a and contacts ATCAa. The opposite end of these contacts is connected to line 78. Line 4 is connected to operating coil T2 to the parallel combination of contacts R8a and R62e to line 17. Line 4 is also connected to R7 and contacts R62a to line 17. Line 4 is connected to coil R8 and contacts T1a to line 17. Line 4 is also connected through coil T3 to line 86. Line 86 is connected to the series combination of contacts R40a, R41a, R42a and R43a to line 126. Line 4 is connected to coil R9 and contacts R25a to contacts T3a and thence to line 86. Line 4 is connected to operating coil R10 and contacts S3a to line 126. Line 4 is connected to operating coil R11 and contacts N1e and contacts N2e and contacts R10e to line 126. Line 4 is connected to operating coil R12 in line 95. Line 95 is connected to contacts R12a and R13b in parallel combination to contacts N3a, N4a and switch contacts S3c to line 126. Line 96 is connected to contacts R12e to line 97, through contact R13c to line 126. Line 97 is connected to parallel contacts M8b, M9b and M10b thence through line 98, contact R2b to line 126. Line 4 is connected through contacts T4e to line 100. Line 100 is connected through coil R13 to line 97, and to coil R30 through line 99, contact R33a to line 126. Line 100 is connected to the parallel combination of T5, R14, R15, R16 and R17 in line 103. Line 103 is connected to parallel contacts R13d and contacts R28a and R29a in series to line 126. Line 100 is also connected to the parallel combination of contacts R11b and R12b in series with the parallel release coils R8, R21 and operating coil T4. Line 100 also joins line 126 through switch M10e, relay 18, contact R21e, contact ATCCe, to line 103, thence through contact R24a. Line 100 is also connected to contacts R20a to operating coil T6 to line 126. Line 100 is also connected to the solenoid combination of operating coils R19 and R20 to line 109. Line 109 is connected to contacts R20e and R22a, R31e, R24a to line 126. Line 100 is also connected to the operating coil R21 and contacts T6a and line 113. Line 113 is connected to contacts ATCCa in line 108. Operating coil R22 is connected between line 100 and 113. Line 100 is also connected to the parallel combination of operating coils R23 and R24 to line 108. Line 100 is connected to operating coil R25 to line 114. Line 114 is connected to the parallel combination of contacts R25b and T3e to line 108. Line 108 is connected to the parallel combination of contacts T3b and R31a to line 126. Operating coil R26 is connected to contacts T2a to line 114. Line 100 is connected to operating coil R27 to the parallel combination of contacts R27b and R3b and thence to line 126. Line 100 is connected to operating coil R28 to the parallel combination of contacts R32a and R28b to line 126. Line 100 is also connected to operating coil R29 to the parallel combination of contacts R21a, R29b and R31b and thence to line 126.

*Card Sensor and Card Head*

Referring now to FIGURE 6 there is provided a card head 507 for reading perforated business machine cards comprising lower contacts 566 and upper contacts 570. The numbered contacts 27 to 80 are the upper contact group and represent the vertical columns of perforated machine card in the particular machine card employed. Column 80 represents the selections of materials to be carried in a given mixture while the remainder of the card represents the quantities of each of these materials. Each group of four columns represents thousands, hundreds, tens and units of pounds of an ingredient to be dispensed. The upper contacts on the guide head are connected to corresponding contacts on layers 1 of the following stepping switches SRB1, SRB2, SRB3, and SRB4. The operating coils of these stepping switches are to be mentioned later in connection with another figure. The lower connections corresponding with the materials column on the perforated card are connected to corresponding contacts on stepping switch SRF1. The upper contacts serving the card reader are connected to selected connections to the layers 3, 4, 5 and of stepping switches SRF. This stepping switch is of course composed of multiple layers on the same switch having the designation SRF. Line 119 is connected to the upper contact of switches SRF, SRB1, SRB2, SRB3 and SRB4. Contacts 254 of stepping switch SRF1 is connected to contact 254. Likewise numbered contacts SRFI, 256, 257, 258, 261 and 262 are connected to corresponding parallel contacts on 568 of stepping switch SRFI and connected through contacts R31c to line 119. Contact 225 is connected to relay R31. Contact 255 is also connected to operating coil of R31 and contacts R33 to line 183. Contact 263 on switch SRFI is connected to operating coil R62 and contacts R9b to line 183. Contact 265 of stepping switch SRFI is connected to operating coil R32 to line 183. Line 183 is connected to the upper contact of layer 2 of stepping switch SRFII. Contact 266 of switch SRFII is connected to contact R24c to line 332. Line 332 is connected to contacts R33d to line 183. Line 332 is also connected to operating coil R33 and contacts R29e to the line 119. Contact 267 on switch SRFII is connected to operating coil R34 to line 273. Line 273 is connected through contacts R44a to line 119. Contact 268 on switch SRFII is connected to operating coil R35 to line 273. Contact 269 on switch SRFII is connected to operating coil R36 to line 273. Contact 270 on switch SRFII is connected to operating coil R37 to line 273. Contact 271 on switch SRFII is connected to operating coil R38 to line 273. Contact 272 on switch SRFII is connected to operating coil R39 to line 273. Line 250 is connected to the top contacts of layer 3 on switch SRFII. Contacts 76, 60, 55, 50, 35 and 30 on stepping SRFIII are connected to corresponding numbered contacts of card head contacts 570. Line 251 is connected to contacts of layer 4 of switch SRFIV. Contacts 69, 59, 54, 49, 34 and 29 of switch SRFIV are connected to corresponding contacts on the card head. Line 252 is connected to upper contacts on stepping switch SRFV. Contacts 68, 58, 53, 48, 33 and 28 are connected to corresponding contacts on the card head. Line 253 is connected to upper contacts on stepping switch SRFVI. Contacts 67, 57, 52, 47, 32 and 27 on switch SRFVI are connected to corresponding contacts on the card head.

*Cement Registering Register*

Referring to FIGURE 7, there is shown schematically the cement measuring register, this register is composed of a number of stepping switches designated as SRC1, SRC2, SRC3, and SRC4. Each of these stepping switches has connected across the contacts thereof a number of electrical resistors or a single tapped resistor connected to the stepping switch contacts at equal distance resistance points along the resistor. Lead 259 connects to wiper arm 575 of deck 1 or layer 1 of stepping switch SRC1. Resistance P5 is connected between the 5th and 6th contact of layer 1 of stepping switch SRC1. Resistor P4 is connected between the 8th and 9th contacts of the same stepping switch. Resistor P3 is connected between the 11th contact of the stepping switch and line 275, which also connects to the first contact. The remaining contacts of the switch are shorted out between the 3rd, 4th and 5th contacts, between the 6th, 7th and 8th contacts and between the 9th, 10th and 11th contacts. The operating coil for this stepping switch is shown elsewhere in this description. Lead 260 connects to the wiper 575 of the 3rd layer of stepping switch SRC1, as well as the 12th contact of this layer. Resistor P11 is connected between the 5th and 6th contacts. Resistor P10 is connected between the 8th and 9th contacts. Resistor P9 is connected between the 11th and 12th contacts. Contacts 3, 4 and 5 are connected to line 295. Contacts 6, 7 and 8 are connected together, and contacts 9, 10 and 11 are connected together. It is noted that resistors P4, P5, P3, P11, P10 and P9 are each 9/10 of an ohm. Line 275 is connected to wiper 573 of layer 1 of stepping switch SRC2, as well as the 12th contact of the stepping switch. A resistance with taps at two ohm intervals is connected between the 3rd, 4th, 5th, 6th, 7th, 8th, 9th, 10th, and 11th contacts designated at 572. A 9th tap resistance also with two ohms is connected from contacts 11 to line 276. Contact 1 of this layer is also connected to line 276. Layer 3 of SRC2 has its wiper connected to line 295, a resistance with taps at two ohms intervals is connected between the 3rd, 4th, 5th, 6th, 7th, 8th, 9th, 10th, 11th and 12th contacts with this stepping switch and thence to line 295, these contacts are also designated at 572. Contact 3 is also connected to line 294. Switch SRC3 has layers 1, 2, 3 and 4 as shown. Layer 4 has contacts 1, 6, 7, 8, 9, 10, 11 shorted to line 297, contact 12 is connected to line 288 as well as the wiper of this layer. Layer 3 of SRC3 has its wiper and contact 12 connected to line 282. The 3rd, 4th and 5th contacts of this layer are connected to line 279 as well as the relay contacts R19a. The other side of relay contacts R19a is connected to the 6th, 7th, 8th, 9th, 10th and 11th contacts of layer 3 as well as line 280. Line 280 is connected through normally closed contacts R19h to line 276. Layer 1 of stepping switch SRC3 has its wiper 577 connected to line 276. The first contact of this layer is connected to line 281. A resistor P7 with taps at 20 ohm intervals is connected between the 3rd, 4th, 5th, 6th, 7th, 8th, 9th, 10th and 11th contacts of this stepping switch. Another 20 ohm resistance designated at 278 is connected from contact 11 to line 281. Contact 11 is connected through relay contacts R19b to line 279. The 6th contact of this layer of the stepping switch is connected through the relay contact R19g to line 279. Layer 2 of stepping switch SRC3 has its wiper and contact 12 connected to line 294. A tapped resistor P13 tapped at 20 ohm intervals is connected to the 3rd, 4th, 5th, 6th, 7th, 8th, 9th, 10th, 11th and 12th contacts of the stepping switch. The 3rd contact of the stepping switch is also connected to wiper 580 and contact 12 of layer 2 of stepping switch SRC4. Contacts 3, 4, 5, 6, 7, and 8 of layer 2 of stepping switch SRC4 are connected to line 292. A resistor P14 tapped at 200 ohm intervals is connected between contacts 8, 9, 10, 11 and 12 of this layer of the stepping switch. Layer 4 of stepping switch SRC4 has its wiper 580 connected to line 281 as well as contact 12 of this layer. Contact 1 is connected to line 286; the 3rd, 4th, 5th, 6th, 7th and 8th contacts of the stepping switch are shorted out. A resistance P8 tapped at 200 ohm intervals is connected between terminals 8, 9, 10 and 11 of this layer of the stepping switch. Line 283 is also connected to terminal 11. Line 283 is connected through the parallel combination of resistor P19 and connects R19f to resistor P18. The other side of resistor P18 is connected through contacts SRC4e and contacts R20f in series to line 297. Potentiometers P15 and P16 are employed for material in air setting of the subject apparatus. The setting of the potentiometers governs the amount by which the cement measuring register is preset according to the predetermined amount of material in the air which will fall after corresponding bin gates are closed. Potentiometers P15 and P16 are 20 ohms each. One end of potentiometer P15 is connected to line 286. The center wiper of the potentiometer is connected through contacts R20b and R20c to line 290. Dribble feed potentiometer P17 having a value of 100 ohms is connected between line 290 and line 287. The center wiper of dribble feed potentiometer P17 is connected to line 288 and thence through contacts R30a to line 296. Contacts R20b and R20c are connected across this potentiometer. The setting of this potentiometer determines the amount of dribble feed desired after a pre-selected material gate has closed and by how much less the cement measuring register must therefore be set.

*Aggregate Measuring Register*

Figure 8:
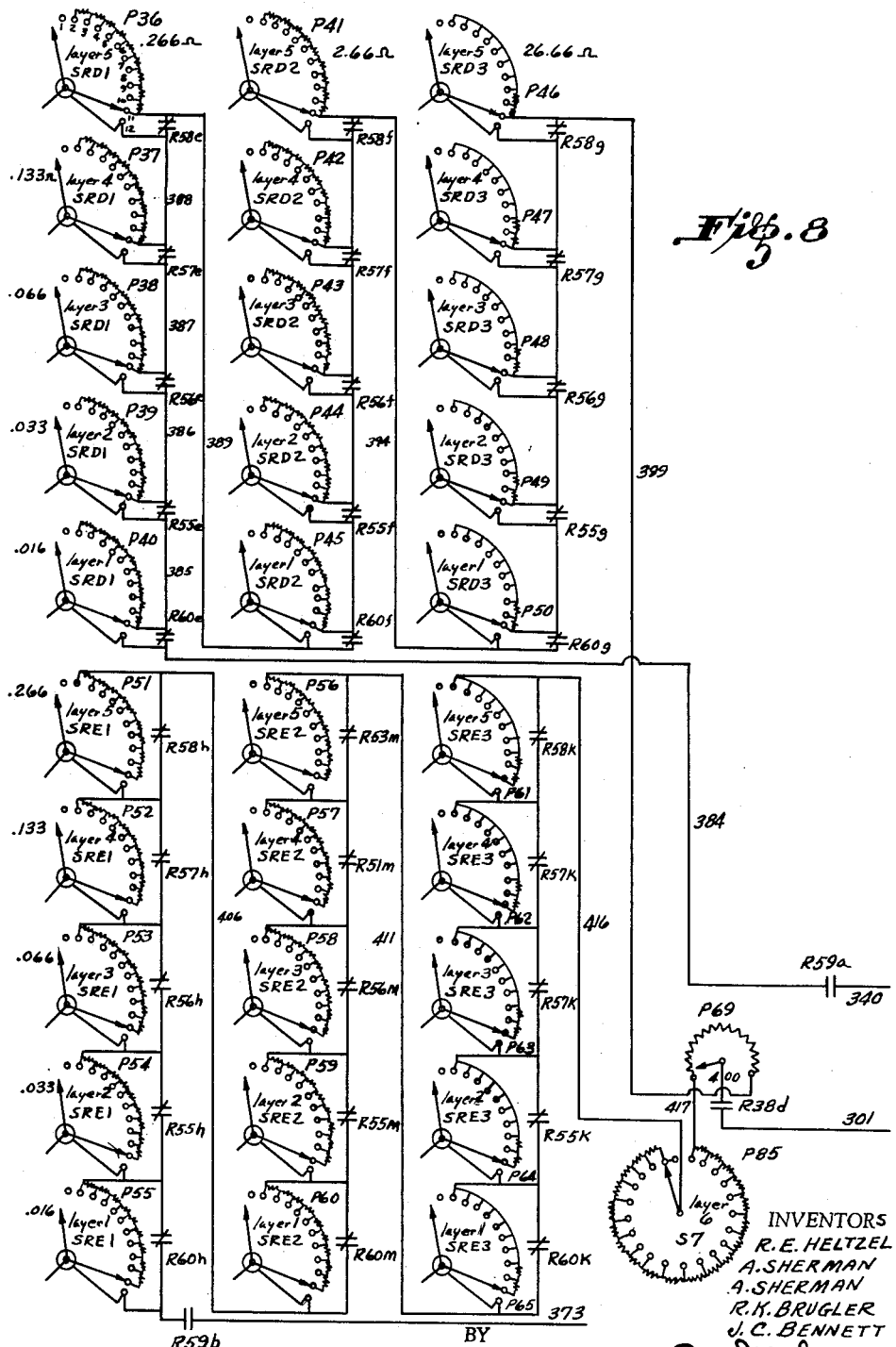
FIGURE 8 is a schematic diagram of a part of the aggregate measuring register.

Referring now to FIGURE 8, there is shown a part of the aggregate measuring register. Stepping switch SRD1 has layers 1, 2, 3, 4, and 5. Resistors P36, P37, P38, P39 and P40 are connected respectively at tapped intervals from the second to the 11th terminal on each of the switch layers. P36 is tapped at .266 ohm intervals; P37 is tapped at .133 ohm intervals; P38 is tapped at .066 ohm intervals; P39 is tapped at .033 ohm intervals, and P40 is tapped at .016 ohm intervals. The wiper of layer 1 of this switch is connected to contact 12 of layer 1 as well as line 384. Relay contact R60e is connected between contacts 11 and 12 of this layer. Contact 11 is also connected to line 385, which is also connected to the wiper of layer 2 as well as the contact 12 of layer 2. Contacts R55e connect contact 12 with contact 11 and line 386. Line 386 is connected to the wiper of layer 3 as well as contact 12 of layer 3. Contacts R56e connect contact 12 with contact 11 and line 387. Line 387 is connected to the wiper contact of layer 4 as well as contact 12 of layer 4. Relay contacts R57e connect contact 12 with contact 11 of this layer and line 388. Line 388 is connected to contact 12 and the wiper of layer 5 of the switch as well as contact R58e, the other end of contacts R58e is connected to line 389 and contact 11 of layer 5. Layers 1 through 5 of stepping switch SRD2 are connected identically with stepping switch SRD1; layers 1 through 5 of stepping switch SRD3 are also connected identically to stepping switch SRD1. The differences lie in the values of the resistors connected across the contacts of the stepping switch layers. P41 of layer 5 of SRD2 is tapped at 2.666 ohm intervals. P42 of layer 4 is tapped at 1.333 ohm intervals. P43 of layer 3 is tapped at .666 ohm intervals. P44 of layer 2 is tapped at .333 ohm intervals. P45 of layer 1 is tapped at .166 ohm intervals. Relay contacts R58, R57, R56, R55, and R60 are the f contacts of this relay rather than the e contacts. Layers 1 through 5 of stepping switch SRD3 each have the 2nd, 3rd, 4th, 5th, 6th, 7th, 8th and 9th contacts shorted out. Resistor P50 tapped at 1.666 ohm intervals is connected across terminals 9, 10 and 11 of layer 1. P49 tapped at 3.333 ohm intervals is connected across terminals 9, 10 and 11 of layer 2. P48 tapped at 6.666 ohm intervals is connected across terminals 9, 10 and 11 of layer 3. P47 tapped at 13.333 ohm intervals is connected across terminals 9, 10 and 11 of layer 4. P46 tapped at 26.666 ohm intervals is connected across terminals 9, 10 and 11 of layer 5. The relay contacts R58, R57, R56, R55 and R60 associated with switch SRD3 are the g contacts of relay R60 rather than the e contacts. The wiper of layer 1 of stepping switch SRD3 is connected with the wiper of layer 5 of stepping switch SRD2. Contact 11 of layer 5 of stepping switch SRD3 is connected to line 399. Stepping switch SRE1 is connected identically to the previously mentioned stepping switches in this figure except that there is no lead brought out from the 11th contact of each of the layers of stepping switches SRE1. Instead the corresponding connection is made to the second contact of each of the layers of stepping switch SRE1. Relay contacts R58, R57, R56, R55 and R60 are the h contacts of these relays rather than the e contacts. Line 406 connects the second terminal of layer 5 of stepping switch SRE1 with the wiper of layer 1 of stepping switch SRE2. Stepping switch SRE2 having layers 1 to 5 is connected identically with stepping switch SRE1. Resistor P56 of layer 5 is tapped at 2.66 ohm intervals whereas P51 associated with layer 5 of SRE1 is tapped at .266 ohm intervals. Resistor P57 associated with layer 4 of SRE2 is tapped at 1.333 ohm intervals instead of .133 ohm intervals as in the case of P52 associated with layer 4 of stepping switch SRE1. Layer 3 of stepping switch SRE2 has associated therewith resistance P58 tapped at .666 ohm intervals rather than .066 ohm intervals as in the case of P53 associated with layer 3 of stepping switch SRE1. P59 connected to the terminals of layer 2 of stepping switch SRE2 is tapped at .333 ohm intervals rather than at .033 ohm intervals as in the case of P54 of layer 2 of stepping switch SRE1. Layer 1 of stepping switch SRE2 has associated therewith resistance P60 tapped at .166 ohm intervals rather than .016 ohm intervals as in the case of P55 associated with layer 1 of stepping switch SRE1. Terminal 2 of layer 5 of stepping switch SRE2 is connected to line 411 and thence to the wiper of layer 1 of stepping switch SRE3. The m contacts of relays R58, R57, R56, R55 and R60 are employed with stepping switch SRE2. Stepping switch SRE3 is connected identically to stepping switch SRE1 except for the resistance values in each layer, 1 through 5, of stepping switch SRE3. Terminals 2 through 9 of each layer of SRE3 are shorted out. P61 tapped at 26.666 ohm intervals is connected across terminals 9 to 11 of layer 5 of stepping switch SRE3. P62 tapped at 13.333 ohm intervals is connected across terminals 9 to 11 of layer 4 of stepping switch SRE3. P63 tapped at 6.666 ohm intervals is connected across terminals 9 to 11 of layer 3 of stepping switch SRE3. P64 tapped at 3.333 ohm intervals is connected across terminals 9 to 11 of layer 2. P65 tapped at 1.666 ohm intervals is connected across terminals 9 to 11 of layer 1 of stepping switch SRE3. The k contacts of relays R58, R57, R56, R55 and R60 are employed in conjunction with stepping switch SRE3 rather than the h contacts. Lead 416 is connected to the wiper of layer 6 of switch S7. Starting from lead 417, 21 contacts of this layer have connected thereacross tapped sections of resistor P85, each section thereof having a value of 4.995 ohms. The 21st and 22nd contacts of layer 6 of switch S7 are shorted out. Lead 417 is further connected to one end of sand-material-in-air potentiometer P69 having a value of 20 ohms. The wiper of this potentiometer is connected through relay contacts R38d to lead 301. The other end of the potentiometer is connected to lead 399. Lead 384 is connected through relay contacts R59a to lead 340. Relay contacts R59b connect the wiper of layer 1 of switch SRE1 to line 373.

Referring to FIGURE 9, there are provided stepping switches SRA1, SRA2, SRA3 and SRA4. Lead 266 is connected to the wiper of layer 1 of stepping switch SRA1. Contact 1 of layer 1 is connected to lead 333. Contacts 2 through 6 have connected thereacross the taps of resistance P21, having a resistance of .333 ohm between taps. The 6th and 7th contacts of this layer are shorted out. The 7th through the 11th contacts of this layer have connected thereacross the taps of resistor P20 having a resistance of .333 ohm between taps. Layer 5 of stepping switch SRA2 has its wiper as well as contact 12 connected to lead 333. The first contact of this layer is connected to lead 334. The second through the sixth contacts of this layer have connected thereacross the taps of resistor P26 having a resistance of 3.333 ohms between taps. The 6th and the 7th contacts of this layer are shorted out. Resistor P25 is connected between the 7th and 8th contacts. Between the 8th and 9th contacts, there is connected a series combination of P24 having the value of 3 ohms, and P23 having the value of .333 ohm. The juncture of these latter two components is connected to line 336. Between the 9th and 11th contacts, there are connected .333 ohm taps of resistor P22. The 11th contact is connected to lead 334 through another tap of resistor P22. Terminal 5 of layer 5 is also connected to line 335. Line 334 is connected to the terminal 12 and the wiper of layer 5 of stepping switch SRA3. Contact 1 of this relay is connected to line 337. The 2nd through the 6th contacts on this layer have connected thereacross taps of resistor P31 having a value of 33.333 ohms between taps. The 6th and the 7th contacts are shorted out. The 7th through the 11th contacts have connected thereacross taps of resistor P30. Contact 11 of layer 5 of stepping switch SRA3 is connected through a series combination of resistors P29, having a value of 13.333 ohms, P28 having the value 9.667 ohms, and P27 having the value of 10.333 ohms to line 337. Line 338 is connected to the juncture between resistor P28 and P29, while line 339 is connected to the juncture between resistors P28 and P27. Line 337 is connected to the wiper of layer 1 of stepping switch SRA4 as well as terminal 12 thereof. Terminal 1 is connected through the relay contacts R62d to line 349, as well as to the remaining end of resistor P32. The 2nd through the 10th contacts of layer 1 of stepping switch SRA4 are shorted out. The 10th and 11th contacts have connected therebetween resistor P35 having the value of 333.333 ohms. Contact 11 is connected to the series combination of resistors P34 having the value of 313.333 ohms, P33 having the value of 9.667 ohms, and P32 having the value of 10.333 ohms to the first contact of this layer of relay SRA4. The juncture between the resistances P32 and P33 is connected to line 342. The juncture between the resistances P33 and P34 is connected to the 10th and 11th contacts of layer 3 of stepping switch SRA4. The remaining contacts of layer 3 of stepping switch SRA4 are left vacant except for the first contact being connected to line 343 and the 12th contact being connected to line 350. Line 350 is also connected to the wiper of layer 3 of stepping switch SRA4. Layer 1 of stepping switch SRA2 has its wiper connected to line 344 as well as terminal 12 thereof. Terminals 2, 3 and 4 are connected to line 335, while terminals 5 through 11 are connected to lead 345. Lead 345 is connected through relay contacts R62f to line 333; line 33 is connected through relay contacts R62c to line 346. Layer 2 of stepping switch SRA2 has its second through its eighth contacts connected to lead 336, while its 9th through 11th contacts are connected to line 346. The wiper as well as terminal 12 of layer 2 of stepping switch SRA2 is connected to line 347 and to the 1st contact of the 2nd layer of stepping switch SRA3. Line 339 connects the 2nd through the 11th contacts of layer 2 of stepping switch SRA3. The 12th contact of this layer as well as the wiper thereof is connected to the 1st contact of layer 4 of stepping switch SRA4. Line 183 is connected to a juncture between relay operating coil R49 and relay contacts R45e. The remaining end of relay operating coil R49 is connected through relay contacts R50a to the first contact of layer 2 of stepping switch SRA1. The 2nd contact of layer 2 of stepping switch SRA1 is connected to lead 355. The wiper as well as contact 12 of layer 2 of stepping switch SRA1 is connected to line 119. The remaining side of contacts R45e is connected through relay operating coil R50 to line 355. Contacts R50b are connected between line 119 and line 355. Line 119 is also connected to wiper and terminal 12 of layer 3 of stepping switches SRA2 and SRA3. The first contact of stepping switch SRA2 layer 3 is connected through relay contacts R52a and operating coil R51 in series to line 183. Line 183 is also connected through relay contacts R46e and relay operating coil R52 to line 359. Line 359 is connected to the second contact of layer 3 of stepping switch SRA2 as well as through relay contacts R52b to line 119. Line 119 is connected through relay contacts R54b to line 363. Line 119 is connected to contact 12 and the wiper of layer 3 of stepping switch SRA3. Line 363 is connected to the second contact of layer 3 of stepping switch SRA3 as well as through operating coil R54 and relay contacts R47e in series to line 183. Line 183 is connected through the series combination of operating coil R53 and contacts R54a to the first contact of layer 3 of stepping switch SRA3. Line 267 is connected to the wiper contacts of terminal 12 of layer 4 of stepping switch SRA1. The 2nd through the 6th contacts of layer 4 have connected thereacross taps of resistors P83 having a resistance of .333 ohm between taps. The 6th and 7th contacts are connected together. The 7th through the 12th contacts of layer 4 have connected thereacross taps of resistor P84. Line 369 connects the 2nd contact of the aforementioned layer 4 to the wipers of layer 6 of stepping switch SRA2. The 2nd through the 6th contacts of layer 6 of stepping switch SRA2 have connected thereacross taps of a resistor P81 having a resistance of 3.333 ohms between taps. Contacts 6 and 7 are connected together, while contacts 7 to 12 have connected thereacross taps of a resistor P82. Terminal 12 is also connected to line 369. Terminal 2 is connected to line 370 and thence to terminal 12 of layer 6 of stepping switch SRA3 as well as the wiper thereof. The 2nd through the 6th contacts of layer 6 of SRA3 have connected thereacross taps of a resistor P79 having a resistance of 33.33 ohms between taps. The 6th and 7th contacts of layer 6 are connected together. The 7th through 12th contacts of layer 6 have connected thereacross taps of a resistor P80. Line 371 connects contacts 2 of layer 6 of stepping switch SRA3 with wiper contacts as well as contact 12 of layer 2 of stepping switch SRA4. Contacts 2 through 10 are connected to line 373. Line 373 is connected through resistor P76 having the value of 100 ohms to line 372. Line 372 joins the one side of contacts R59a, resistor P77, having the value of 233.333 ohms, and the remaining end of P76. The remaining end of contacts R59a is connected to terminal 10 of layer 2. The remaining end of resistor P77 is connected to one end of resistor P78, having a value of 333.333 ohms, which is connected between terminals 11 and 12 of layer 2 of stepping switch SRA4. Line 340 is connected through relay contacts R39c to line 418 which is in turn connected to the wiper of potentiometer P74 having 12 taps and a resistance of .33 ohm between each tap. One end of potentiometer P74 is connected through resistor P68, having a resistance of .333 ohm, to one end of water dribble feed potentiometer P73, having a resistance of 6.66 ohms. The remaining end of potentiometer P73 is connected to line 422. Line 422 connects to the wiper of potentiometer P75, having 12 taps and a resistance of .333 ohm between each tap. One end of potentiometer P75 is connected through relay contacts R39d to line 373. The wiper of potentiometer P73 is connected through relay contacts R5h and R5b in series in line 422. The juncture of the latter contacts is connected to line 301. Line 373 is connected through relay contacts R34d to one end of aggregate 1 material in air potentiometer P72 having a value of 20 ohms. The other end of this potentiometer is connected to line 340. The wiper of this potentiometer is connected through relay contacts R34c to line 301. Line 373 is also connected through relay contacts R35d to one end of aggregate 2 material in air potentiometer P71 having a value of 20 ohms. The other end of potentiometer P71 is connected to line 340. The wiper of potentiometer P71 is connected through relay contacts R35c to line 301. Line 373 is also connected through relay contacts R36d to one end of aggregate 3 material in air potentiometer P70, having a value of 20 ohms. The other end of potentiometer P70 is connected to line 340. The wiper of potentiometer P70 is connected through relay contacts R36c to line 301. The aforementioned resistor P80 has a value of 33.333 ohms between taps. The aforementioned resistor P84 has a resistance of .333 ohm between taps. The aforementioned resistor P82 has a resistance of 3.333 ohms between taps.

*Card Sensor and Measuring Circuit Control*

Referring now to FIGURE 10A, line 119 is connected to a parallel combination of relay contacts R14a and R24d in series with the parallel combination of relay contacts R25e and R26a. The opposite end of the combination is connected to line 171. Line 171 connects one end of relay contacts SRB1a, SRB2a, SRB3a, SRB4a and relay operating coil R48. Relay operating coil SRB5 is connected between line 176 and the remaining end of contact SRB1a. Operating coil SRB6 is connected between line 176 and the remaining end of relay contacts SRB2a. Operating coil SRB7 is connected between line 176 and relay contacts SRB3a. Operating coil SRB8 is connected between line 176 and relay contacts SRB4a. Line 176 is also connected to the remaining end of operating coil R48. Line 176 is connected through the series combination of relay contacts R43c, R48e, R9e, R14e and operating coil SRF to line 119. The juncture between relay contacts R9e and R14e is connected through relay contacts R44e to line 181. Line 181 is connected through relay contacts R48f and R1b to line 210. Line 181 is also connected through relay contacts R44b to line 212. The juncture between operating coil SRF and relay contacts R14e is connected through relay contacts SRFg to contact 1 of twenty-seven contact layer 7 of stepping switch SRF2. Contact 1 is also connected to the wiper contacts of this layer. Contacts 2 through 26 are connected together and connected through relay contacts R14b to line 183. Line 119 is connected through operating coil SRB1 to line 191. Line 191 joins one end of relay contacts R23e, R23a and R40e. The remaining end of relay contacts R23e is connected through relay contacts R14g and operating coil SRC1 to line 119. The juncture between relay contacts R14g and operating coil SRC1 is connected through relay contacts SRC1g to the second terminal of layer 2 of stepping switch SRC1. The 2nd through the 11th contacts of layer 2 of stepping switch SRC1 are connected together. The wiper as well as contact 12 of this layer is connected through relay contacts R14d to line 183. Relay contacts R40e join line 191 with line 215. Line 215 is connected through a series combination of relay contacts R51e, R53e and R49e to line 212. Line 191 is also connected through the series combination of relay contacts R23a, R14f, and SRA1e to line 188. Relay coil SRA1 joins line 188 to line 119. Line 188 is also connected through relay contacts SRA1a and SRA1f in series to line 176. Line 188 is also connected to the second terminal of layer 3 of stepping switch SRA1 through relay contacts SRA1g. Terminals 2 through 11 of layer 3 are connected together. Wiper contacts plus contact 12 of layer 3 are connected through relay contacts R14c to line 183. Line 176 is connected through relay contact T4f to line 183. Line 183 is connected to one end of relay operating coils R40, R41, R42, R43 and R44. The remaining ends of these operating coils are connected to lines 250, 251, 252, 253 and 254 respectively. Line 250 is connected through relay contacts R40b to line 249. Relay contacts R41b connect line 249 to 251. Relay contacts R42b connect line 249 to line 252. Relay contacts R43b connect line 249 to line 253. Relay contact R44b connect line 249 to line 254. Line 119 is connected through the parallel combination of relay contacts R24e and relay contacts R26e and R25c in series to line 249. Line 119 is connected through contacts R38c to one end each of relay operating coils R60, R55, R56, R57, R58 and R59 in FIGURE 10B. The other end of relay operating coil R60 is connected through the even numbered contacts from 2 to 20 of layer 1 of switch S7. The remaining end of relay operating coil R55 is connected to the 2nd, 3rd, 6th, 7th, 10th, 11th, 14th, 15th, 18th, and 19th contacts of layer 2 of switch S7. The remaining end of operating coil R56 is connected to contact 1, 6, 7, 8, 9, 14, 15, 16 and 17 of layer 3 of switch S7. The remaining end of operating coil R57 is connected to contact 6, 7, 8, 9, 10, 11, 12 and 13 of layer 4 of switch S7 in FIGURE 10B. Each of the layers of switch S7 has 22 contacts; contacts not mentioned are left unconnected. The wipers of all layers of switch S7 are connected to line 183. Line 183 is also connected through relay contacts R15c to the wiper of layer 5 of stepping switch SRC3 as well as contact 12 thereof. Contacts 2 through 11 of layer 5 of stepping switch SRC3 are connected through relay contacts SRC3g to line 217. Line 217 joins operating coil SRC3 and relay contact R15h and R23g in series to line 225. Line 225 is also connected to a series combination of contacts R51f and R42e to line 215. The juncture of contacts R51f and R42e is connected through operating coil SRB3 to line 119. Line 119 is connected to operating coil SRA3 and contacts SRA3g to contacts 2 through 11 of layer 4 of stepping switch SRA3. The wiper of layer 4 as well as contact 12 thereof is connected through relay contacts R16a to line 183. Line 221 is connected through relay contacts SRA3e and R16e in series to line 223. Line 221 is also connected through relay contacts SRA3a and SRA3f in series to line 176. Line 223 is connected to line 225 through relay contacts R23c; line 223 is also connected through relay contacts R51g and R37b in series to line 226. Line 226 is connected through relay operating coil SRD2 to line 119. Line 226 is also connected through relay contact SRD2g to contacts 2 through 10 of layer 6 of stepping switch SRD2. The wipers of layer 6 of stepping switch SRD2 as well as terminal 12 thereof are connected to line 230. Line 226 is connected through relay contacts R16h to line 305. Line 305 joins one end of operating coil SRE2 and relay contacts SRE2g. The remaining end of relay coil SRE2 is connected to line 119. The remaining end of relay contacts SRE2g is connected to terminals 2 through 10 of layer 6 of stepping switch SRE2. Terminal 12 is connected to line 230 as well as through relay contacts R16d to line 183.

Referring now to FIGURE 10B, line 119 is connected through operating coil SRB4 to the juncture between relay contacts R53f and R43f. Line 119 is also connected through operating coil SRC4 to line 234 which joins relay contacts SRC4g and relay contacts R16f. The remaining side of relay contacts R16f is connected through R23h to line 237. Line 237 is connected to the remaining end of relay contacts R53f, while the remaining end of relay contacts R43f is connected to line 215. The juncture between relay SRC4 and relay contacts R16f is connected through relay contacts SRC4g to contacts 2 through 11 of layer 3 of stepping switch SRC4, the wiper of layer 3 of stepping switch SRC4 is connected through relay contacts R16c to line 183. Operating coil SRA4 connects to lines 119 and 238. Line 238 is connected through relay contacts R16g to line 240. Line 240 is connected through relay contacts R23g to line 237. Line 240 is also connected through relay contacts R37c and R53g in series to line 241. Line 238 is connected through relay contacts SRA4g and to contacts 2 through 11 of layer 5 of stepping switch SRA4. The wiper as well as terminal 12 of layer 5 is connected through relay contacts R16b to line 183. Operating coil SRD3 connects line 119 and line 241. Line 241 is connected to contacts 1 through 10 of layer 6 of stepping switch SRD3 through contacts SRD3g. Terminal 12 as well as the wipers of layer 6 is connected by line 244 to terminal 12 of layer 6 of stepping switch SRE3. Line 241 is connected through relay contacts R17g to line 245. Line 245 is connected through operating coil SRE3 to line 119. Line 245 is connected through relay contacts SRE3g to terminals 1 through 10 of layer 6 of stepping switch SRE3. The wipers as well as terminal 12 of layer 6 are connected through relay contacts R17c to line 183. Line 119 is connected through operating coil R47 and contacts R53a in series to line 237. Line 237 is connected through relay contacts R53b to line 212. Line 183 is connected to the wiper contact of layer 5 of switch S7. Relay operating coil R58 connects line 311 and contacts 1, 2, 3, 4 and 5 of layer 5. Operating coil R59 connects line 311 and line 183. Line 119 is connected through relay operating coil SRB2 to the juncture of relay contacts R41f and R41e. The other end of relay contacts R41f is connected to line 197. The other end of relay contacts R41e is connected to line 215. Line 197 is connected through relay contacts R23f and R15f in series to line 195. Line 195 is connected through relay operating coil SRC2 and to line 119. Line 195 is connected through relay contacts SRC2g to contacts 2 through 11 of layer 2 to stepping switch SRC2. The wiper contacts of layer 2 as well as terminal 12 thereof is connected through relay contacts R15b to line 183. Line 119 is connected through the operating coil SRA2 to line 200. Line 200 is connected through the series combination of relay contacts SRA2e, R15g and R23b to line 197. The juncture of relay contacts R15g and R23b is connected through relay contacts R37a and R49g in series to line 204. The juncture of relay operating coil SRA2 and relay contacts SRA2e is connected through relay contacts SRA2g to terminals 2 through 11 of layer 4 of stepping switch SRA2. This juncture is also connected through the series combination of relay contacts SRA2a and SRA2f to line 176. The wiper of layer 4 is connected through relay contacts R15a to line 183. The wiper contact of layer 4 is also connected to contact 12 thereof. Operating coil SRD1 connects to line 119 and line 204. Line 204 is connected through relay contacts SRD1g to contacts 1 through 10 of layer 6 of stepping switch SRD1. The wiper of layer 6 as well as terminal 12 thereof is connected to the wiper of layer 6 of stepping switch SRD1 as well as terminal 12 thereof. These wipers are also connected through relay contacts R15d to line 183. Line 204 is connected to the juncture of operating coils SRD1 and relay contacts SRD1g and through relay contact R15e to line 207. Operating coil SRE1 connects to line 119 and line 207. Line 207 is connected through relay contacts SRE1g to terminals 1 through 10 of layer 6 of stepping switch SRE1. Line 119 is connected through relay operating coil R45 and contacts R49a in series to line 197. Line 197 is connected through relay contacts R49b to line 212.

Line 119 is connected through relay operating coil 146 and contacts R51a in series to line 225. Line 225 is connected through relay contacts R51b to line 212.

*Moisture Compensation*

When the aggregate measuring register is set for the sand dry weight, the moisture compensation register is set at the same time. Before the actual weighing begins, a fixed value of resistance P76 (FIG. 9) of 100 ohms is removed from the bottom half of the measuring register (100 ohms represents the maximum value of moisture in pounds. Since the weigh dial range is 30,000 lbs., 10 percent, or maximum percentage, equals 3,000 lbs. Since 1 ohm equals 30 lbs., 100 ohms equals the 3,000 lbs.). The fixed resistor is then replaced by the moisture register and variable resistor P85 (FIG. 8). Depending on the set percentage, resistance is then removed from the resistor P85 and replaced by the selected resistors in the moisture register. This is necessary to keep the total resistance in the measuring register fixed at all times. Resistance then set on the SRD step switches is added to the top of the measuring register and the resistance set on the SRE step switches is added to the bottom. The different layers of the moisture step switches have calculated resistors that represent ½, 1, 2, 4, and 8 percent of the corresponding weight set for the dry sand. By selecting various combinations of layers on the hundreds, thousands, and ten thousands step switches (SRD1, SRD2, SRD3) respectively, and (SRE1, SRE2, SRE3), also respectively (FIG. 8), and adding together, using the binary system, any percentage from ½ to 10 percent of the dry weight punched in the card can be selected. In essence, applicants are merely taking part of the fixed 100 ohms that were shorted out in the beginning and adding the proper amount to the top leg to adjust the cut-off point to include additional material to make up for the moisture contained in the dry weight. Then by removing the moisture register when water is weighed as the next material, the measuring register forgets that extra sand was added and weighs water as though only dry sand, as punched in the card, had been weighed previously. The weight of the water is then short the amount of extra sand added. In brief, the point of cut-off for water remains the same for a given punched weight regardless of the amount of moisture compensated for, so as the moisture increases, the amount of water weighed decreases by the same amount.

*The Business Card*

Figure 11:
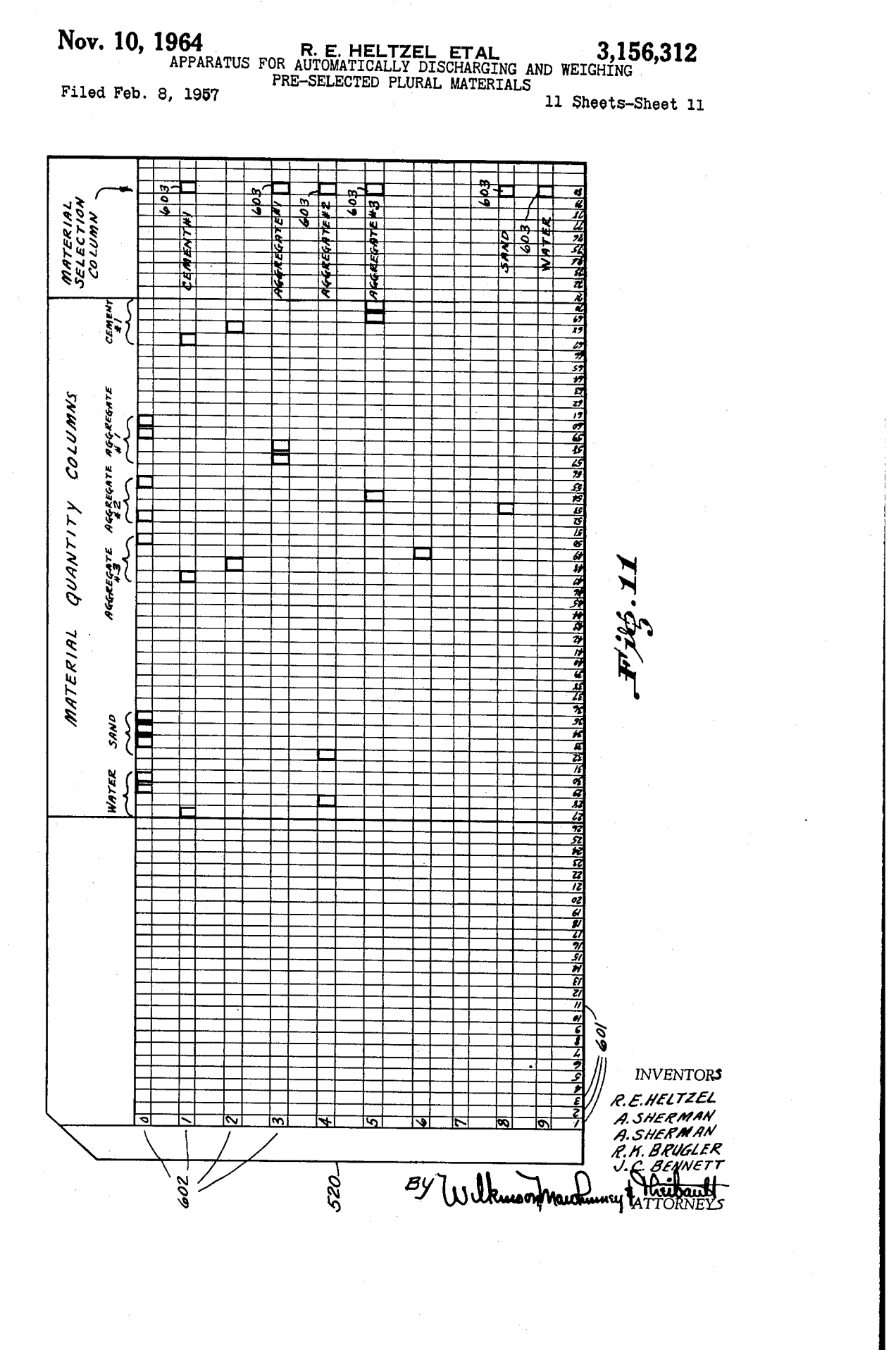

Referring to FIGURE 11, there is shown a sample perforated business machine card that may be employed with this invention as a direction media. Card 520 has numbered columns 601 and rows 602. The column numbered 80 indicates the types of materials desired in a concrete mixture where the card punchings or perforations 603 appear. Other columns on the card with their respective perforations indicate the quantity of each material desired. Thus it is seen that cement number 1 is desired in a quantity of 1655 pounds, since there is a perforation in column 80 corresponding to cement number 1, and since column 67 contains a "one" punching, column 68a "six," column 69 a "five" and column 70 a "five."

The quantities of each material desired are punched into the card using a decimal code in addition to the desired weight of each material rather than the cumulative scale reading being punched into the card. After using the card for the delivery of concrete it can then be used in a standard business machine calculator for purposes of adding deliveries of materials, accounting and billing.

Operation will be described in detail as follows:

Referring to FIGURE 2, upon connecting the unit to 110 volts 60 cycle power this A.C. voltage is present between lines 1 and 125 and a heater is energized. Power to this heater flows through line 1, switch S1e, line 2, fuse F7, line 3, the two heaters, line 126, fuse F2, line 125, in FIGURE 2. This heater prevents moisture from damaging the unit. When the switch S1 is turned to its "ON" position the heater is disconnected by opening S1e and power flows from line 1 through switch S1a, line 124, fuse F1, line 4, lights L1 and L2, fuse F3 and the 110 volt input of the cement comparison in FIGURE 3B, fuse F4 and the 110 volt input of the aggregate comparison in FIGURE 3A, line 126, F2 in FIGURE 2, to line 125. At this time transformer X2 in FIGURE 3A receives power through lines 254 and 255 from the 6.3 volt transformer output of the cement comparison, and transformer X3 in FIGURE 3B receives power through lines 261 and 262 from the aggregate comparison.

The cement and aggregate comparison units include stepdown transformers between the 110 volt terminals and the 6.3 volt terminals to convert 110 volt power into 6.3 volt power.

Turning the switch S3 to "AUTOMATIC" closes contacts S3e in FIGURE 2 and S3f in FIGURE 5 and opens contacts S3a in FIGURE 5 and S3b in FIGURE 4. Current flows through line 4, light L3 in FIGURE 5, S3f to line 126 on a signal light to indicate automatic operation.

After sufficient time has elapsed to allow the unit to warm up a card can be inserted into the card holder to close microswitch K1a in FIGURE 5 when the card is all the way in and in the proper position. Power flows from line 4, through contact K1a, line 8, coil R1 to line 126. R11 is also energized at this time through current flow through line 4, R11, line 92, contact N1e in FIGURE 5, line 93, contact N2e, line 94, contact R10e, to line 126. The energizing of relay R1 closes contacts R1a in FIGURE 5 and R1b in FIGURE 10A, power flows through line 4, R1a in FIGURE 5, line 15, R11a in FIGURE 5, line 124, R17e in FIGURE 5, line 120, V14 in FIGURE 7 through contact K2e, FIGURE 5.

Energizing solenoid V14 in FIGURE 7 brings down contacts in the card head to read the card. As these contacts come down microswitch K2 is actuated and contacts K2a in FIGURE 5 and b in FIGURE 2 close while contact K2e in FIGURE 5 opens. Opening K2e cuts off power from V14 but it is mechanically latched to hold the contacts in place. Power through line 4, R1a in FIGURE 5, line 15, L3, line 19, contact K2a, line 126 will energize light L3 to indicate that the card is in place. In FIGURE 2, from line 4, through K2b, line 9, R26g, line 10, R9f, line 11, G1, line 12, R17h, line 13, R32a, line 14, S3e to line 126 will start motor G1 operating to provide pulsed power. Also through line 4, K26b, line 9, the primary of X1 to line 126 will energize the secondary of transformer X1 to provide A.C. of transformed voltage between lines 268, 269 which will be rectified by the rectifier 556 to supply 48 volts D.C. between lines 270 and 271 and through fuses F5 and F6 to lines 119 and 176. Pulsed D.C. is provided between lines 119 and 210 by the opening and closing of contact G1A, operated by motor G1, between lines 176 and 210. This pulsed power is used to energize operating coils of the stepping switches.

A card is punched as shown in FIGURE 11 to provide the materials in the quantities as shown in Table 1.

TABLE I

|  | Lbs. | Columns |
|---|---|---|
| Cement 1 | 1,255 | 67-70 |
| Aggregate 1 | 3,300 | 57-60 |
| Aggregate 2 | 1,850 | 52-55 |
| Aggregate 3 | 1,260 | 47-50 |
| Sand | 4,000 | 32-35 |
| Water | 1,400 | 27-30 |

In FIGURES 10A and 10B the pulsed D.C. travels through line 210, R1b, line 211, R48f, line 181, R44e, line 178, R14e, line 177, coil of SRF and line 119. Stepping switch SRF is constructed such that as the coil of SRF becomes energized the contacts of this step switch cannot move. When the power goes off at the coil SRF, then the contacts of SRF step forward one position. When SRF has received its first pulse and takes its first step a circuit is closed from line 119 through layer one of the SRF stepping switch, line 254, through the hole punched in column 80 row 0 in the card to line 80, to relay coil R44, to line 183, contact T4f, line 176 energizing coil R44. Energizing of R44 causes contacts of R44a in FIGURE 6 and b and c in FIGURE 10 to close and R44e to open. The next pulse goes through line 210 in FIGURE 10, R1b, line 211, R48f, line 181, R44b, line 212, R49e, line 213, R51e, line 214, R53e, line 215. From line 215 power goes as follows: (1) through R40e, line 191, through SRB1, coil, line 119, and also R40e, line 191, R23e, line 186, R14g, line 185, coil SRC1, to line 119; (2) through R41e, line 194, coil of SRB2 and also R41e, line 194, R49f, line 197, R23f, line 196, R15f, line 195, coil SRC2 to line 119; (3) through R42e, line 216, SRB3, and line 119, and also R42e, line 216, R51f, line 225, R23g, line 218, R15h, line 217, to coil of SRC3, line 119 and line 215 through R43f, line 232, SRB4, coil, to 119; (4) and also through R43f, line 232, coil SRB4 to line 119 and R43f, line 232, R53f, line 237, R23h, line 233, through R16f, line 234, coil SRC4, to line 119. Upon receiving the first impulse all stepping switches SRB1, SRC1, SRB2, SRC2, SRB3, SRC3, SRB4, and SRC4 are constructed such that they take one step forward. However, before a second pulse can arrive to step SRB4 and SRC4 power flows through line 119, layer 1 of SRB4 in FIGURE 6, line 275 through the hole punched in column 67, row 1 in the card, line 67, layer 6 of SRF, line 253, relay R43, to line 183 to energize R43. Energizing of relay R43 closes contacts R43a in FIGURE 5, R43b and R43c in FIGURE 10 and opens R43e. Any further pulses will not reach SRB4 and SRC4. Power will now flow through line 176, R43c, line 180, R48e, line 179, R9e, line 178, R14e, line 177, the coil of SRF to line 119. However SRF will not advance at this time. A second pulse will now move stepping switches SRB1, SRC1, SRB2, SRC2, SRB3, and SRC3 to position ten. At this time power will flow through line 119, layer 1 of SRB3 in FIGURE 6, line 276, through the hole punched in column 68, row 2 in the card, line 68, through layer 5 of SRF in FIGURE 6, line 252, coil R42, to line 183. This will energize R42 to keep any further impulses from stepping SRB3 and SRC3.

The third impulse, the fourth, and fifth impulse will cause stepping switches SRB1, SRC1, SRB2, and SRC2 to move into position 7. This time the current will flow from line 119 through layers 1 of SRB1 and SRB2 in FIGURE 6 and through line 279 through the holes punched in columns 69 and 70, row 5 of the card, lines 69 and 70, layers 3 and 4 of SRF in FIGURE 6, lines 250 and 251 through coils R40 and R41 in FIGURE 10 to line 183, energizing coils R41 and R40 to close contacts R40a in FIGURE 5, R40c, FIGURE 10, R41a in FIGURE 5 and R41b in FIGURE 10 as well as opening R40e and R41e in FIGURE 10. No further pulses can now arrive to move the step switches.

A circuit is now closed through line 4, coil T3, line 86, R40a, line 87, R41a, line 88, R42a, line 89, R43a, line 126 in FIGURE 5. The energizing of T3 closes contacts T3a and T3b and opens T3e. Closing contact T3b allows power to go from line 100 through coils R23 and R24, line 108, T3b, to line 126. The closing of R24d in FIGURE 10 allows power to flow through line 119, R24d, line 120, R25e, line 171, SRB1a, SRB2a, SRB3a, and SRB4a, the latter four contacts close whenever the step switch which they are associated with is off of the "HOME" position—lines 172, 173, 174, 175, coils SRB5, SRB6, SRB7, SRB8, to line 176, which causes step switches SRB1, SRB2, SRB3, and SRB4 to return to their "HOME" position as well as energizing R48. When R24c in FIGURE 6 opens it deenergizes R40, R41, R42, R43, and R44. This deenergizing of R40, R41, R42, and R43 causes T3 to deenergize. When relay R48 energized to open R48e in FIGURE 10, it disconnected power from the coil of step switch SRF causing it to move ahead one step. However T3 has a time delay which keeps its contacts from acting until after a time delay is over. The SRF moving ahead one step, connected power from line 183, layer two of SRF in FIGURE 6, line 266, contact R24c, line 274, relay R33, line 275, contact R29e to line 119. Closing contact R33a in FIGURE 5 allows power to flow through line 100, coil R30, line 99, R33a, line 126 energizing R30 and closing R30a and R30b in FIGURE 7 in the aggregate measuring circuit. When contact T3b in FIGURE 5 closed a circuit existed through 126, T3b, line 108, contacts ATCCe, line 107, R21e, line 106, coil R18, line 105, to contact M10e. If the cement hopper gate is closed then contact M10e connected thereto is closed and power will flow to line 100, energizing relay R18; if, however, this hopper gate is open the delivery of cement cannot start until it closes to energize R18. However, even if R18 is energized no flow of cement can begin until the start button is pushed.

After the time delay is over the contacts of coil T3 in FIGURE 5 act, opening contacts T3a and T3b and closing contact T3d. Closing contact T3e allows power to flow through line 100, coil R25, line 114, T3e, line 108, R24a, to line 126. Opening contact R25e in FIGURE 10 disconnects power from homing coils SRB5, SRB6, SRB7, SRB8 of SRB1, SRB2, SRB3, SRB4 and relay R48. The coils SRB5, SRB6, SRB7, and RB8 had, of course, been disconnected from power when their respective off-normal contacts B1a and B2a in FIGURE 5, B3a and B4a in FIGURE 4 had opened upon reaching "HOME." Closing contact R48f in FIGURE 10 allows power to flow through 210, R1b, line 211, R48f, line 181, R44e, line 178, R14e, line 177, coil SRF to line 119. As SRF steps forward upon receiving each pulse it passes connection 255 to relay R31, but R31 does not energize because contact R33e in FIGURE 6 between lines 259 and 183 is open. Upon taking its sixth step a circuit is closed from line 119 to contact 6 on layer 1 of SRF, line 256, a punching in row four of column 80 in the card through line 80, coil R44 in FIGURE 10, to line 183 and causes contact R44a in FIGURE 6, R44b and R44c in FIGURE 10 to close and contact R44e to open. Opening R44e disconnects the coil of SRF from pulsing power. Closing contact R44b allows pulsing power to go through line 210, R1B, line 211, R43f, line 181, R44b to line 212, R49e, line 213, R51e, line 219, R53e, line 215. From line 215 power flows as follows: (1) R40e, line 191, coil SRB1 to line 119 and also R40e, line 191, R23a, line 190, R14f, line 189, SRA1e, line 188, coil SRA1 to line 119. (2) R41e, line 194, coil SRB2 to line 119 and also R41e, line 194, R49f, line 197, R23b, line 202, R15g, line 201, SRA2e, line 200, SRA2 to line 119 (3) R42e, line 216, coil SRB3 to line 119, and also R42e, line 216, R51f, line 225, R23c, line 223, R16c, line 222, SRA3e, line 221, coil SRA3 to line 119 and (4) R43f, line 232, SRB4, to line 119, also R43f, line 232, R53f, line 237, R23d, line 240, R16g, line 238, coil SRA4 to line 119. However, before any pulses arrive to move the above step switches power will flow through line 183, coil R40, line 250, layer 3 of SRF in FIGURE 6, line 60, the hole punched in row 0 of column 60 in the card line 274, layer 1, SRB1, to line 119 to energize relay R40 power will also flow through line 183, coil R41 in FIGURE 10, line 251, layer 4 of step switch SRF in FIGURE 6, line 59, through the hole punched in row 0 of column 58 in the card, line 274, layer 1 of SRB2 to line 119 to energize R41. Energizing relays R40 and R41 will not allow switches SRB1, SRA1, SRB2, and SRA2 to be stepped. Three pulses will arrive at SRB3, SRA3, SRB4, and SRA4 to move them to position 3. At this time power will flow from line 183 through coil R42 in FIGURE 10, line 252, layer 5 of SRF in FIGURE 6, line 58 through the hole punched in row 3 of column 58 in the card, line 277 through layer 1 of SRB3, to line 119 energizing R42. Power also flows through line 183, coil R43 in FIGURE 10, line 253, layer 6 of SRF, line 57, through the hole punched in row 3 of line 57 in the card, line 277, layer 1 of SRB4 in FIGURE 6 to line 119 energizing coil R43 in FIGURE 10. This will stop the pulser from further advancing SRB3, SRA3, SRA4, and SRB4. Closing contact R43c allows power to flow through line 176, R43c, line 180, R48e, line 179, R9e, line 178, R14e, line 177, coil SRF to line 119. However, the contacts of SRF will not advance until power is disconnected from its coil. Closing contacts R40a, R41a, R42a, and R43a in FIGURE 5 allows power to flow through line 4, coil T3, line 86, R40a, line 87, R41a, line 88, R42a, line 89, R43a to line 126. Closing contact T3a allows power to flow through line 4, coil R9, line 90, R25a, line 7, T3a, line 86, R40a, line 87, R41a, line 88, R42a, line 89, R43a to line 126. Opening contact R9e in FIGURE 10 disconnects power to the coil of SRF and moves SRF ahead one step. Power now flows through line 176, T4f, line 183, layer 2 of SRF in FIGURE 6, line 267, relay coil R34, line 273, R44a to line 119. If the hopper gates of aggregate and water hoppers are closed power will flow through line 4, hopper contacts M8e in FIGURE 5, line 73, M9e, line 74, coil R4, line 75, R8e, line 76, T1e, line 82, R6e, line 78, R9a to line 126. If the aggregate and water hoppers are open relay R4 cannot energize to allow the delivery of aggregates. Even if the hoppers are closed, closing M8e and M9e, delivery of aggregate will not start until the "START" button is pushed. When R9 energized, contact R9f in FIGURE 2 opened to disconnect power from motor G1 and stop the pulsating power across lines 210 and 119.

The unit is now ready to begin the delivery of Aggregate One and Cement upon pushing the start button B1. Pushing the start button allows power to flow through line 4, R1a in FIGURE 5, line 15, R11a, line 124, B1a, line 123, R17f, line 129, coil R3, and light L5, line 130, R2e, to line 126, to energize relay R3 and light L5 to indicate that material is being delivered. Closing contact R3a allows power to flow through line 4, R1a, line 15, R3a, line 123, R17f, line 129, coil R3, line 130, R2e, to line 126; therefore, when the start button B1 is released, relay R3 stays energized. Closing contact R3b allowed power to flow through line 100, coil R27, line 116, R3b to line 126. All of the bins are closed but gate operating solenoid coils V5, V11, and V12 in FIGURE 4 will be energized to open bins and deliver Aggregate One and Cement to their respective hoppers. An air valve of the Aggregate One bin will receive power through line 126, M7e, M6e, line 141, M5e, line 140, M4e, line 139, M3e, line 138, R34a, line 137, S5e, line 142, S6e, line 143, R4b, line 146, solenoid V5, line 147, R34b, line 153, R24b, line 160, R3c, to line 4 energizing solenoid V5 and opening the Aggregate One bin. Power will also flow through line 126, R33b, line 162, S4e, line 154, R18a, line 156, solenoid V11, line 157, R19e, line 59, R33c, line 153, R24b, line 160, R3c, to line 4. Power will also flow through line 156, motor starter M, solenoid V12, and light L10, line 158, B10e, line 159, R33c, line 153, R24b, line 160, R3c, to line 4. The energizing of the above mentioned motor starter and solenoids will cause both fast and slow or "dribble" feed of cement. Opening the Aggregate One and Cement bins closes microswitches M2a in FIGURE 5 and M1a. Power will flow through line 5, M1a and M2a, lines 166 and 167 and lights L9 and L11. Lighting L9, L10 in FIGURE 4 and L11 in FIGURE 5 indicates that Cement and Aggregate One is being delivered. Until either cement or Aggregate One reaches the desired weight no further action of the above circuit takes place. However, in the comparison circuits the voltage outputs of the cement and aggregate differential transformers are constantly varying as the dial indication of the scale increases.

When the cement measuring circuit reaches a balance point, contact ATCCe shown in FIGURES 3A and 5 opens and contact ATCCa shown in the same drawings, closes. Opening ATCCe deenergizes relay R18-opening contact R18a in FIGURE 4. However, opening R18a will not stop the flow of cement because power will still flow from line 154, through R10g, line 155, T6e, to line 156 to keep M and V12 energized. Closing ATCCa in FIGURE 5 allows power to flow through line 100, coil R22, line 113, ATCCa, line 108, R24a to line 126. Power will then flow through line 100, R19, T6 and R20, line 109, R20e, line 110, R22a, line 111, R31e, line 108, R24a, to line 126. Though the energizing of R20 causes contact R20e to open it also closes contact R20a to keep relays R20, R19, and T6 connected to line 126. Opening contact R19e in FIGURE 4 disconnects bin operating solenoid V11 from power and stops the rapid flow of cement. The action of contacts R20b and R20c in FIGURE 7 in the measuring circuit again cause the contact ATCCe in FIGURE 5 to close and ATCCa to open. While relay T6 has been energized its contacts do not act until after a time delay. Closing ATCCe allows power to flow through line 100, through M10e, line 105, coil R18, line 106, R21e, line 107, ATCCe, line 108, R24a, to line 126. After the time delay is over contacts T6e in FIGURE 4 open and T6a in FIGURE 5 closes. The opening of T6e in FIGURE 4 means that when contact R18a between lines 154 and 156 open the flow of cement will be stopped. Closing T6a in FIGURE 5 will allow energizing relay R21, when the ATCCa contact closes. When the cement reaches the punched weight minus the material in air setting, contact ATCCe opens and ATCCa closes, due to the action of coil ATCC. Opening contact ATCCe removes power from coil R18. Opening contact R18a in FIGURE 4 will disconnect power from motor starter M, and light L10. The delivery of cement has stopped. Closing ATCCa in FIGURE 5 allows power to flow through line 100, R21, line 112, T6 and R22, line 113, ATCCa, R24a to line 126. Closing contact R21a causes power to flow through line 100, R29, line 118, R21a to line 126. Opening contact R29e in FIGURE 6 disconnects power from relay R33 causing it to deenergize. Opening R33 deenergizes R30 to disconnect the Cement measuring register. When aggregate one reaches a weight equal to the punched weight minus a material in air setting, the transducer causes coil ATCA to operate.

When aggregate one thus reaches a weight equal to the punched weight minus the material in air setting, contact ATCAe shown in FIGURES 3 and 5, opens and ATCAa closes. Power will flow through line 4, coil R6, line 81, R5f, line 17, and coil T2, line 83, R62e, ATCAa, line 78, R9a, to line 126. When R6e opens it disconnects relay R4 from power, opening contact R4b in FIGURE 4 and cutting off power from solenoid V5 which, therefore, stops the flow of Aggregate One to the aggregate hopper. Though relay T2 is a time delay relay its contacts act immediately upon energizing the coil and have a delay in their action upon the deenergizing of relay T2. Closing contact T2a in FIGURE 5 allows power to flow through line 100, coil R26, line 115, T2a, line 114, R25b, line 108, R24a, to line 126. Closing contact R26a allows power to flow from line 119, R24d, line 120, R26a in FIGURE 10, line 171, SRB1a, SRB2a, SRB3a, SRB4a, lines 172, 173, 174, 175, coils SRB5, SRB6, SRB7, and SRB8 to line 176, causing step switches SRB1, SRB2, SRB3, and SRB4 to return to their "HOME" position as well as energizing coil R48. When R26e opens it deenergizes coils R40, R41, R42, R43, and R44. This causes T3 and R9 to be energized, by opening contacts R40a, R41a, R42a, and R43a in FIGURE 5. Opening contact R44a in FIGURE 6 deenergizes coil R34, opening contacts R34c and R34d in FIGURE 9 in the aggregate measuring register and causing contact ATCAa in FIGURE 5 to open and ATCAe to close. Opening contact ATCA deenergizes coils T2 and R6. After the time delay is over contact T2a opens to deenergize coil R26. Opening contact R26a in FIGURE 10 disconnects power from the homing coils SRB5, SRB6, SRB7, SRB8, SRB1, SRB2, SRB3, SRB4 and relay R48. When R9 deenergized, contact R9f in FIGURE 2 closed to allow power to flow through line 4, K2b, line 9, R26g, line 10, R9f, line 11, motor G1, line 12, R17h, line 13, R32e, line 14, S3e to line 126. Contact G1a then provides pulsed power between lines 119 and 210. Closing contact R48f in FIGURE 10 allows pulse power to flow through line 210, R1b, line 211, R48f, line 181, R44e, line 178, R14e, line 177, coil SRF to line 119.

In determining the other materials desired as well as the quantity of each one desired the same steps as we have gone through for Aggregate One will be repeated over and over again, for the other materials.

After the last material has come up to weight pulse power will again flow through line 210, R1b, line 211, R48f, line 181, R44e, line 178, R14e, line 177, coil SRF, to line 119 in FIGURE 10. The contacts of step switch SRF will step ahead until a circuit is closed through line 119, layer one of SRF in FIGURE 6, line 265, coil R32, to line 183. Power will then flow from line 100, coil R28, line 117, contacts R32a, to energize relay R28; the motor G1 in FIGURE 2 will be deenergized by contact R32e opening. When R28a in FIGURE 5 closed, power flowed from line 100 through coils T5, R14, R15, R16 and R17, line 103, R28a, line 104, R29a to line 126. While relays R14, R15, R16, R17 have their contacts act immediately, the contacts of T5 have a time delay before acting. The contacts of R14, R15, R16, and R17 cause power to "HOME" all of the SRC, SRB, and SRA step switches as well as the SRF step switch. For example power will flow through line 176, T4f in FIGURE 10, line 183, R14c, line 193, through layer three of SRA1, line 302, SRA1g, line 188, coil SRA1, to line 119. This power causes coil SRA1 to energize, opening contact SRA1g and causing the contacts of SRA1 to advance one step. Closing SRA1g again energizes coil SRA1 to open SRA1g to advance SRA1 another step. In this manner the contacts of SRA1 as the contacts of all other SRA, SRC, and SRF step switches will advance until they reach their "HOME" where no connection exists to step them ahead. Step switches SRB1, SRB2, SRB3, and SRB4 are homed by current flow through line 176, coils SRB5, SRB6, SRB7, and SRB8, lines 172, 173, 174, 175 contacts SRB1a, SRB2a, SRB3a, SRB4a, line 171, R14a, to line 119.

Closing contact R17a in FIGURE 5 allows power to flow through line 4, R1a, line 15, R17a, line 18, S2e, line 16, V13, to line 126. Energizing V13 lifts the contacts of the card head from the card and expels the card from the holder. This causes K1a, K2a and K2b in FIGURE 2 to open and K2e in FIGURE 5 to close. Transformer X1, light L1, and relay R1 are therefor, deenergized. Opening R1a deenergizes R3 and V13.

Since all materials are now completely weighed out, the weigh hoppers can be discharged. Turning the cement and aggregate discharge switches S4, S5, and S6 to allow power to flow from line 4 through V1, V2, line 131, S4a in FIGURE 4, line 132, R3f, line 133, M1e to line 126. Power also flows through line 4 solenoids V3 and V4, lines 134 and 135, S5a and S6a to line 136, R3g, line 137, M2e, line 138, M3e, line 139, M4e, line 140, M5e, line 141, M6e, M7e to line 126. Energizing the solenoids causes the material to be discharged from the hoppers. When the hoppers are completely empty power will flow through line 4, coil R11 in FIGURE 5, line 92, N1, line 193, N2, line 94, R10e to line 126. When the hoppers are empty switches S4, S5, and S6 can be turned to open contacts S4a, S5a, and S6a in FIGURE 4 and release power from the hopper discharge gates.

Power will flow through line 100, R11b in FIGURE 5, line 101, release coils R8, R21, and coil T4, line 102, T5a to line 126 when the time delay in the action of contact T5a has gone by. The contact T4e in FIGURE 5 and f in FIGURE 10 open immediately to remove homing power from all step switches and deenergize all relays except R11. The contacts of T4 are slow to act on the deenergizing of coil T4 in FIGURE 5 to insure that all relays are deenergized before contacts T4f in FIGURE 10 and T4e in FIGURE 5 close again.

The batcher has now completed one card controlled delivery of concrete and is ready to accept another card to deliver another batch.

If switch S2 is turned to a "RECYCLE" position, the batch is weighed out exactly as before except that contact S2e being open will not energize solenoid V13 to expel the card. The conclusion of one batch, therefore, causes another batch to begin. In addition, the start button need not be pushed because S2b serves this purpose.

If switch S3 is turne dto the "MANUAL" position, relay R10 is energized by current flow through line 4, coil R10, line 91, S3a to line 126. Pushing buttons B3 through B10 will then cause delivery of material manually.

When the pulse arrived to move the contacts of step switch SRA3 to position 2 a circuit was closed through line 119, layer three of SRA3 in FIGURE 9, line 363, coil R54, line 362, R47e, to line 183. Energized R54 closes contacts R54a and R54b. When the contacts of SRA3 move to position 1, coil R54 remains energized by current flow through line 119, R54b, line 363, coil R54, line 362, R47e, to line 183 and R53 is energized through line 119, contact 1 of layer three of SRA3, line 360, R54a, line 361, coil R53, to line 183. Closing contacts R53a and R53b in FIGURE 10 allows power to flow through line 212, R53b, line 237, R53a, line 247, coil R47 to line 119, and also from line 237, R23d, line 240, R16g, line 238, coil SRA4, to line 119. Energizing R47 opens R47e in FIGURE 9 to deenergize R54 which opens R54a to deenergize R53. Opening R53a and R53b in FIGURE 10 deenergizes R47 and SRA4. When SRA4 deenergizes it causes its contacts to move one step ahead. (The above provides for moving SRA4 one position when SRA3 represents digit zero and should be at ten.)

The above example holds for SRA2, SRA3, SRA4, but not for SRA1. SRA1 can never have a digit added to it. Opening R53g in FIGURE 10 keeps the pulse from reaching SRE and SRD when weighing sand.

When the contacts of step switch SRA3 move to position 7 a circuit is closed through line 176, SRA3f, line 224, SRA3a, line 221, coil SRA3, to line 119 in FIGURE 10. Energization coil SRA3 opens contact SRA3f which de-energizes coil SRA3 to move the contacts of SRA3 to position 6. (The above action is needed because the step switches have 11 contacts instead of 10. In order to work properly the SRA's must reach position 1, "HOME," when the SRA represents the digit zero.)

The above example holds for SRA1, SRA2, SRA3, but not for SRA4. SRA4 can never reach position seven. Opening SRA3e in FIGURE 10 when SRA3a closes keeps the pulse from reaching other step switches.

When sand is being set up, energizing R37 allows pulses to step SRD's and SRE's according to the punching for sand.

The action of SRC1, SRC2, SRC3, SRC4, R19, R20, the "material in air" control and the "dribble control," set up the following resistance values in the cement measuring register, when 1255 lbs. of cement with 100 lbs. "dribble" and 20 lbs. "material in air" or "MIA" is desired.

|  | Top Resistor | Top Resistance, Ω | Bottom Resistor | Bottom Resistance, Ω |
| --- | --- | --- | --- | --- |
| SRC1 in position 7 | P3+P5 | 1.2 | P11 | .6 |
| SRC2 in position 7 | 5 taps P6 | 10.0 | P12 | 8.0 |
| SRC3 in position 10 | 2 taps P7 | 40.0 | P13 | 140.0 |
| SRC4 in position 11 | P13 | 80.0 | P14 | 600.0 |
| MIA for 20 pounds | {P15 P16} | 16.0 | P15 P16 | 4.0 |
| Dribble for 100 pounds | P17 | 80 | P17 | 20.0 |
|  |  | 227.2 |  | 772.6 |

Trip point for discontinuing material
$$=\frac{(227.2)(5,000)}{(227.2+772.6)}=\frac{(227.2)(5,000)}{999.8}=1136.0$$

After the above trip point R20c and R20b close and R19f opens, the following resistances follow:

|  | Top, Ω | Bottom, Ω |
| --- | --- | --- |
| SRC1 in position 7 | 1.2 | .6 |
| SRC2 in position 7 | 10.0 | 8.0 |
| SRC3 in position 10 | 40.0 | 140.0 |
| SRC4 in position 11 | 180.0 | 600.0 |
| MIA for 20 pounds | 16.0 | 4.0 |
| Dribble for 100 pounds | 0.0 | 0.0 |
|  | 247.2 | 752.6 |

$$\text{Trip point}=\frac{(247.2)(5,000)}{227.2+772.6}=\frac{(247.2)(5,000)}{999.8}=1,236.0 \text{ pounds}$$

Material in air = 20.0
Cement delivered = 1,256 pounds

The aggregate measuring register works as illustrated below for Aggregate One with a setting of 3,300 pounds.

|  | Resistor, Top | Resistance, Ω, Top | Resistor, Bottom | Resistance, Ω, Bottom |
| --- | --- | --- | --- | --- |
| SRA4 in position 12 |  | 000.000 | P76+P77+P78 | 666.66 |
| SRA3 in position 9 | P22 | 9.999 | P79+2 taps P80 | 199.98 |
| SRA2 in position 9 | 2 taps P30+P29 | 79.999 | P81+2 taps P82 | 19.99 |
| SRA1 in position 12 |  | 0.000 | P83+P84 | 2.99 |
| MIA 150 pounds | P72 | 15.000 | P72 | 5.00 |
|  |  | 104.998 |  | 894.62 |

$$\text{Trip point}=\frac{(104.998)(30,000)}{(104.998+894.62)}=\frac{(104.998)(30,000)}{999.6}=3,150 \text{ pounds}$$

MIA = 150 pounds

Aggregate One Delivered = 3,300 pounds

The aggregate measuring register works as illustrated below for sand with 6,310 pounds of previous aggregates and 4,200 pounds of 5% moisture sand desired.

|  | Resistor, Top | Resistance, Ω, Top | Resistor, Bottom | Resistance, Ω, Bottom |
| --- | --- | --- | --- | --- |
| SRA4 in position 11 | P34 | 313.333 | P78+P77 | 233.333 |
| SRA3 in position 12 |  | 0.0 | P80+P79 | 299.997 |
| SRA2 in position 6 | P22+P23+P24+P25 | 16.665 | P81 | 13.332 |
| SRA1 in position 11 | 1 tap P20 | .333 | P83+4 taps P84 | 2.664 |
| SRD1—4% in position 10 | 2 taps P37 | .266 |  |  |
| SRD1—1% in position 10 | 2 taps P39 | .066 |  |  |
| SRD2—4% in position 8 | 4 taps P42 | 5.332 |  |  |
| SRD2—1% in position 8 | 4 taps P44 | 1.332 |  |  |
| SRD3—4% in position 12 |  | 0.0 |  |  |
| SRD3—1% in position 12 |  | 0.0 |  |  |
| SRE1—4% in position 10 |  |  | 7 taps P52 | .931 |
| SRE1—1% in position 10 |  |  | 7 taps P54 | .231 |
| SRE2—4% in position 8 |  |  | 5 taps P57 | 6.665 |
| SRE2—1% in position 8 |  |  | 5 taps P59 | 1.665 |
| SRE3—4% in position 12 |  |  | 2 taps P62 | 26.666 |
| SRE3—1% in position 12 |  |  | 2 taps P64 | 6.666 |
| Sand MIA 90 pounds | P69 | 17.000 | P69 | 3.000 |
| Switch 7 layer 6 position 10 |  |  | 10 taps P85 | 49.950 |
|  |  | 354.327 |  | 645.100 |

$$\text{Trip point}=\frac{(354.327)(30,000)}{354.327+645.100}=\frac{(354.327)(30,000)}{999.4270}=10,630.0 \text{ pounds}$$

MIA = 90.0 pounds

Scale reading after sand delivered = 10,720.0 pounds
Previous material weight − 6,310.0 pounds Moist sand delivered = 4,410.0 = 4,200 + (5%)(4,200) = 4,410

Although we have disclosed herein the best form of the invention known to us at this time, we reserve the right to all such modifications and changes as may come within the scope of the following claims.

What we claims is:

1. A cumulative material weighting apparatus comprising means for detecting data on an information media which data indicates types and quantities of material to be successively accumulated, a common material collection and weight indicating means, plural means for delivery of selected ones of said materials to said collection and weight indicating means, an electrical transducer operable by said collection and indicating means including a transformer having a primary winding and a center-tapped secondary winding means supplying power to said primary winding, said transformer also having a movable core piece physically connected to said collection and indicating means, an electrical register which includes two variable electrical resistances, means for varying said resistances differentially in response to said means for detecting data, means connecting one end of a first of said resistances to a first end of said secondary winding, means connecting one end of a second of said resistances to a second end of said secondary winding, means connecting to a common point the remaining ends of said resistances, and means connected between said common point and said center-tap for signaling said plural means for delivery to change the type of material being delivered when said collection and indicating means equals the amount set in said register.

2. The apparatus as recited in claim 1 wherein the means connected between said common point and said center tap comprises a relay coil having contacts operable thereby, and means connected through said contacts to discontinue the flow of material being delivered.

3. The apparatus as recited in claim 2 having interposed between the ends of said resistances and said common point further adjustable resistances for altering the setting of said register in accordance with predetermined water content of materials.

4. The apparatus as recited in claim 3 wherein said further adjustable resistances are inserted in and removed from the circuit under direction from said means for detecting data indicating the type of material being delivered to said collection and weighing means.

5. The apparatus as recited in claim 3 wherein said adjustable resistances are inserted in and removed from the circuit through normally closed relay contacts bypassing said adjustable resistances, and wherein said relay contacts are actuated by an energizing coil operable by said means for detecting data.

References Cited in the file of this patent
UNITED STATES PATENTS

| | | |
|---|---|---|
| 2,109,534 | Johnson | Mar. 1, 1938 |
| 2,318,591 | Couffignal | May 11, 1943 |
| 2,431,058 | Manning | Nov. 18, 1949 |
| 2,650,057 | Goland | Aug. 25, 1953 |
| 2,656,109 | Lindars | Oct. 20, 1953 |
| 2,801,819 | Lindars | Aug. 6, 1957 |
| 2,868,491 | Thorsson et al. | Jan. 13, 1959 |

OTHER REFERENCES

"Concrete Goes Automatic," Business Week, April 16, 1955, pp. 80, 82.